(12) United States Patent
Baliguat et al.

(10) Patent No.: US 11,044,372 B2
(45) Date of Patent: Jun. 22, 2021

(54) IMAGE FORMING APPARATUS

(71) Applicant: KYOCERA Document Solutions Inc., Osaka (JP)

(72) Inventors: Shara Camille Baliguat, Osaka (JP); Judy Dayondon, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/727,193

(22) Filed: Dec. 26, 2019

(65) Prior Publication Data

US 2020/0228672 A1 Jul. 16, 2020

(30) Foreign Application Priority Data

Jan. 10, 2019 (JP) .............................. JP2019-002618

(51) Int. Cl.
*H04N 1/00* (2006.01)

(52) U.S. Cl.
CPC ..... *H04N 1/00572* (2013.01); *H04N 1/00427* (2013.01); *H04N 1/00474* (2013.01); *H04N 1/00482* (2013.01); *H04N 1/00779* (2013.01)

(58) Field of Classification Search
CPC combination set(s) only.
See application file for complete search history.

(56) References Cited

U.S. PATENT DOCUMENTS

| | | | |
|---|---|---|---|
| 8,596,541 B2* | 12/2013 | Chiu | G06K 7/1443 235/462.31 |
| 2005/0073696 A1* | 4/2005 | Mackenzie | H04N 1/00413 358/1.6 |
| 2006/0109492 A1* | 5/2006 | Inoue | G06F 3/1244 358/1.13 |
| 2006/0193491 A1* | 8/2006 | Nakamura | H04N 1/32293 382/100 |
| 2006/0268332 A1* | 11/2006 | Shimada | H04N 1/32101 358/1.15 |
| 2007/0002354 A1 | 1/2007 | Iwasaki | |
| 2007/0121164 A1 | 5/2007 | Ii | |
| 2008/0309957 A1 | 12/2008 | Horiuchi et al. | |
| 2010/0085590 A1* | 4/2010 | Williams | G06F 3/1244 358/1.13 |

(Continued)

FOREIGN PATENT DOCUMENTS

JP 2011-035667 A 2/2011

OTHER PUBLICATIONS

Extended European search report issued by the European Patent Office dated Jun. 2, 2020, which corresponds to European Patent Application No. 20150046.9-1010 and is related to U.S. Appl. No. 16/727,193.

*Primary Examiner* — Helen Zong
(74) *Attorney, Agent, or Firm* — Studebaker & Brackett PC

(57) ABSTRACT

An image forming apparatus includes an image forming section, a receiving section, and a controller. The image forming section forms a plurality of images on a plurality of sheets. The receiving section receives a print job including a layout format indicating a layout of the images on the sheets. The controller controls the image forming section based on the print job. Each of the images indicates an image expressed by image data of a single page. The print job includes an instruction to form the images on the sheets according to a plurality of mutually different layout formats.

7 Claims, 19 Drawing Sheets

(56) References Cited

U.S. PATENT DOCUMENTS

| | | |
|---|---|---|
| 2011/0032562 A1 | 2/2011 | McCuen et al. |
| 2011/0246947 A1 | 10/2011 | Hirohata et al. |
| 2016/0154614 A1* | 6/2016 | Saito .................... G06F 3/1205 358/1.9 |
| 2016/0191751 A1* | 6/2016 | Izumi .................... G06F 1/3212 358/1.13 |

* cited by examiner

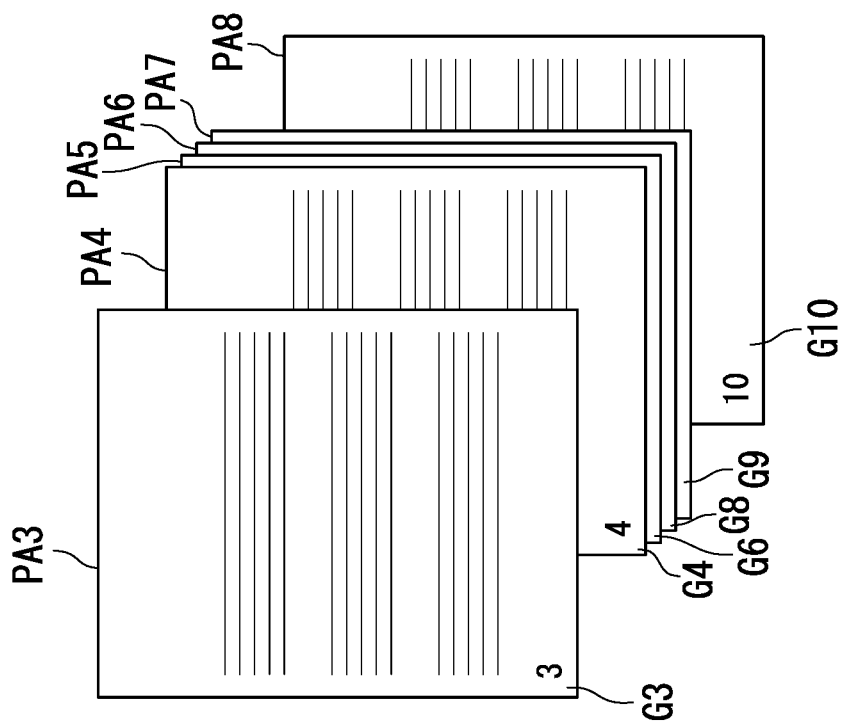
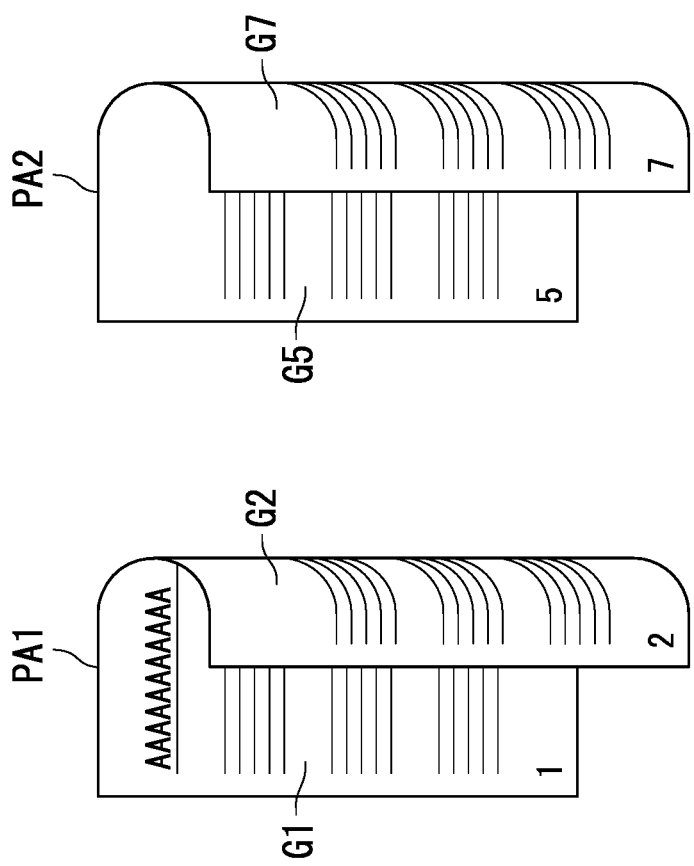
FIG. 4A
FIG. 4B
FIG. 4C

IMAGE FORMING APPARATUS

INCORPORATION BY REFERENCE

The present application claims priority under 35 U.S.C. § 119 to Japanese Patent Application No. 2019-002618, filed on Jan. 10, 2019. The contents of this application are incorporated herein by reference in their entirety.

BACKGROUND

The present disclosure relates to an image forming apparatus.

Printing apparatuses capable of duplex printing on a sheet are generally known. Such a printing apparatus includes a receiving section and a printing mechanism. The receiving section receives a print job from a user. The print job includes a selection of duplex printing. The printing mechanism prints information on a sheet. With this printing apparatus, it is possible to print information on both sides of the sheet.

SUMMARY

An image forming apparatus according to an aspect of the present disclosure includes an image forming section, a receiving section, and a controller. The image forming section forms a plurality of images on a plurality of sheets. The receiving section receives a print job including a layout format indicating a layout of the images on the sheets. The controller controls the image forming section based on the print job. Each of the images indicates an image expressed by image data of a single page. The print job includes an instruction to form the images on the sheets according to a plurality of mutually different layout formats.

BRIEF DESCRIPTION OF THE DRAWINGS

FIG. 4A is a diagram illustrating a sheet on which an image is formed on either side thereof in the first embodiment.

FIG. 4B is another diagram illustrating a sheet on which an image is formed on either side thereof in the first embodiment.

FIG. 4C is a diagram illustrating a plurality of sheets on each of which an image is formed on one side thereof in the first embodiment.

DETAILED DESCRIPTION

Figure 1:
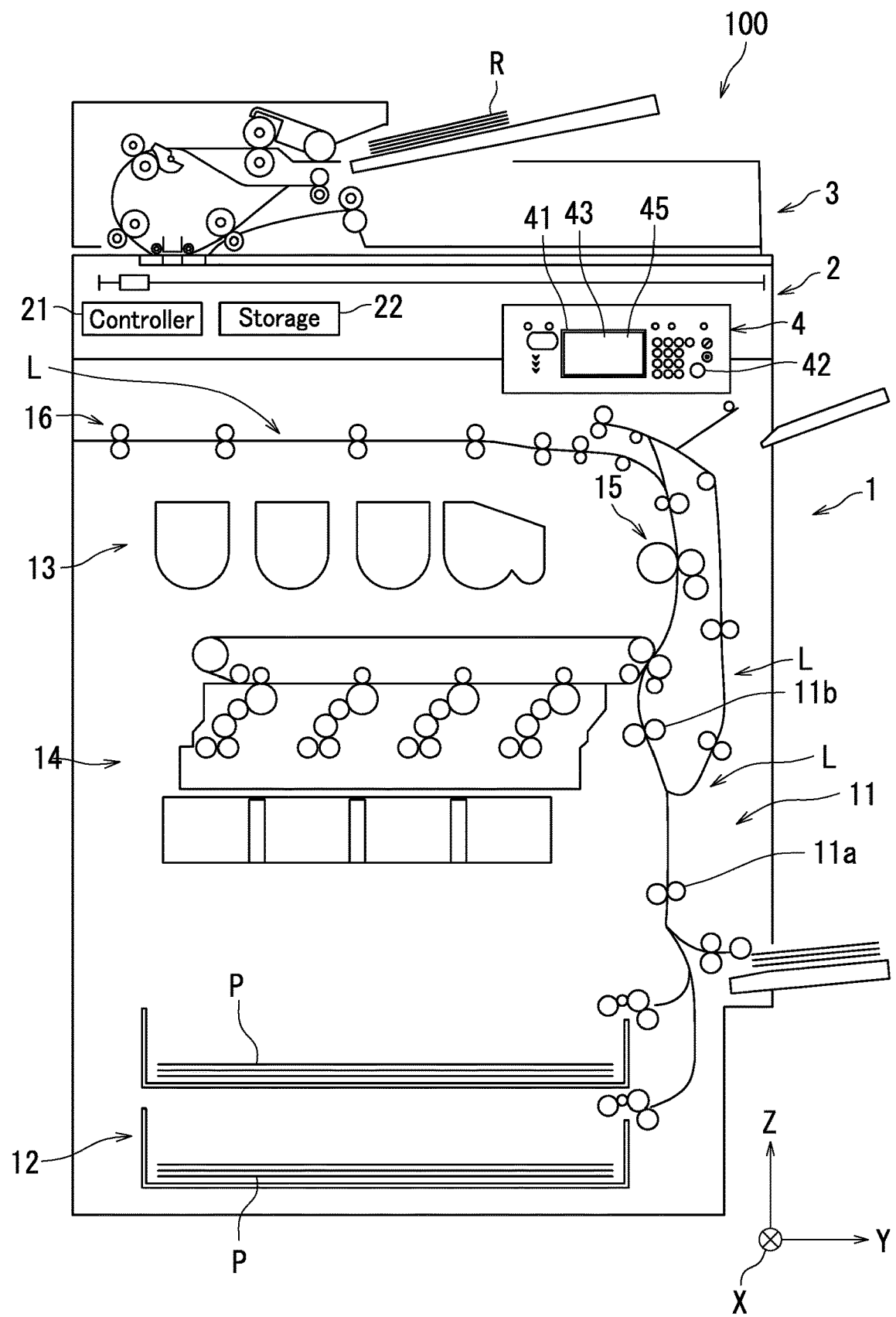
FIG. 1 is a diagram illustrating a configuration of an image forming apparatus according to a first embodiment of the present disclosure.

The following describes embodiments of the present disclosure with reference to the accompanying drawings. Elements that are the same or equivalent are labeled with the same reference signs in the drawings and description thereof is not repeated. In the embodiments of the present disclosure, X, Y, and Z axes are orthogonal to each other. The X and Y axes are parallel to a horizontal plane, while the Z axis is parallel to a vertical direction.

First Embodiment

First, a configuration of an image forming apparatus 100 according to a first embodiment of the present disclosure is described with reference to FIG. 1. FIG. 1 is a diagram illustrating the configuration of the image forming apparatus 100. The image forming apparatus 100 is a color multifunction peripheral. The image forming apparatus 100 may also be communicatively connected to a personal computer.

As illustrated in FIG. 1, the image forming apparatus 100 includes an image forming unit 1, an image reading unit 2, a document conveyance unit 3, and an operation display section 4. The image forming unit 1 forms an image on a sheet P. The image reading unit 2 reads an image from a document R and generates image data indicating the image. The document conveyance unit 3 conveys the document R to the image reading unit 2.

The operation display section 4 includes a touch panel 41 and an operation button 42. The touch panel 41 includes a display device 43 and a touch sensor 45. The display device 43 displays various images. Examples of the display device 43 include a liquid-crystal display (LCD). The touch sensor 45 receives operation from a user. The operation button 42 also receives operation from the user. Specifically, the touch sensor 45 and the operation button 42 receive a print job. The touch sensor 45 and the operation button 42 are each equivalent to an example of a "receiving section".

The touch panel 41 generates operation information indicating content of operation from the user each time the operation from the user is received. Specifically, the touch panel 41 displays a plurality of icons. The user taps an icon. The touch panel 41 then generates, as operation information, information indicating that an icon has been tapped.

The operation display section 4 changes the screen image displayed on the touch panel 41 based on the operation from the user. Specifically, the operation display section 4 displays a screen image on the touch panel 41 corresponding to an icon which received the operation from the user among the icons displayed on the touch panel 41. The operation display section 4 reads out screen image information corresponding to the screen image displayed on the touch panel 41 from storage 22.

The image forming unit 1 includes a conveyance mechanism 11, a feeding section 12, a toner supply section 13, an image forming section 14, a fixing section 15, an ejection section 16, a controller 21, and the aforementioned storage 22. The image forming unit 1 has a conveyance path L.

The conveyance path L guides the sheet P from the feeding section 12 to the ejection section 16. The conveyance path L extends from the feeding section 12 to the ejection section 16.

The conveyance mechanism 11 conveys the sheet P. Specifically, the conveyance mechanism 11 conveys the sheet P to the ejection section 16 by way of the image forming section 14 and the fixing section 15. The conveyance mechanism 11 can also convey a sheet P with an image fixed thereto by the fixing section 15 to the image forming section 14. A process through which the sheet P with an image fixed thereto is conveyed to the image forming section 14 may be referred to as a switchback process. The switchback process is performed when an image is formed on each of the pair of main surfaces of the sheet P.

The conveyance mechanism 11 includes a conveyance roller 11a and a registration roller 11b.

The conveyance roller 11a conveys the sheet P ejected from the feeding section 12 to the registration roller 11b. The conveyance roller 11a is located in the conveyance path L.

The registration roller 11b adjusts the timing at which sheets P are conveyed to the image forming section 14. The registration roller 11b conveys the sheets P to the image forming section 14 at a prescribed interval. The registration roller 11b is located in the conveyance path L. The registration roller 11b is located upstream of the image forming section 14 in a conveyance direction of the sheets P.

The feeding section 12 feeds a sheet P to the conveyance path L. Examples of the sheet P include plain paper, copy paper, recycled paper, thin paper, thick paper, glossy paper, and an overhead projector (OHP) sheet.

A plurality of toner containers are attached to the toner supply section 13. One of the toner containers contains cyan toner. One of the toner containers contains magenta toner. One of the toner containers contains yellow toner. One of the toner containers contains black toner.

The image forming section 14 forms an image on a sheet P. Specifically, the image forming section 14 forms a plurality of images on a plurality of sheets P. The image forming section 14 includes a transferring section. The transferring section transfers an image to a sheet P. As a result, an image is formed on the sheet P.

The image forming section 14 is provided as a plurality of image forming sections. One of the image forming sections forms a cyan toner image. One of the image forming sections forms a magenta toner image. One of the image forming sections forms a yellow toner image. One of the image forming sections forms a black toner image.

The image forming section 14 includes a transferring section, image bearing members, chargers, exposure sections, and developing sections.

The transferring section transfers toner images to a sheet P. The transferring section includes an intermediate transfer belt. The intermediate transfer belt is an endless belt. Toner images of a plurality of colors are formed on the intermediate transfer belt. Specifically, the image forming section 14 forms a plurality of toner images on the intermediate transfer belt. As a result, the toner images of a plurality of colors are superimposed on to the intermediate transfer belt, forming an image on the intermediate transfer belt. The image formed on the intermediate transfer belt is then transferred to the sheet P. As a result, an image is formed on the sheet P.

Each of the image bearing members is drum-shaped and has an axis of rotation. The image bearing member rotates clockwise around the axis of rotation. The image bearing member includes a photosensitive layer on an outer circumferential surface thereof.

The chargers each charge the photosensitive layer of a corresponding one of the image bearing members to a prescribed potential. The exposure sections each expose the photosensitive layer of a corresponding one of the image bearing members by radiating laser light. The exposure sections each expose a corresponding one of the image bearing members based on image data. As a result, electrostatic latent images are formed on the respective image bearing members.

The developing sections develop the electrostatic latent images formed on the respective image bearing members. The developing sections each have a development roller. The development roller supplies toner to the image bearing member and develops the electrostatic latent image formed on the image bearing member, thus forming a toner image. As a result, toner images are formed on the outer circumferential surfaces of the respective image bearing members.

The transferring section transfers the toner images formed on the outer circumferential surfaces of the respective image bearing members to the sheet P. As a result, the toner images are transferred to the sheet P.

The fixing section 15 fixes the toner images formed on the sheet P to the sheet P. Specifically, the fixing section 15 applies heat and pressure to the sheet P, thus fixing the toner images formed on the sheet P to the sheet P. The fixing section 15 includes a heating roller 151 and a pressure roller 152. The heating roller 151 is cylindrical with an axis of rotation, and rotates around the axis of rotation. The heating roller 151 is heated by a heater. Examples of the heater include a halogen heater. The heater is located inside the heating roller 151 and heats the heating roller 151.

The ejection section 16 ejects the sheet P out of the image forming apparatus 100. After the fixing section 15 has fixed the toner images to the sheet P, the conveyance mechanism 11 conveys the sheet P from the fixing section 15 to the ejection section 16. The ejection section 16 then ejects the sheet P with the toner images fixed thereto out of the image forming apparatus 100.

The controller 21 controls operation of the image forming apparatus 100. The controller 21 includes a processor. Examples of the processor include a central processing unit (CPU). The storage 22 includes a storage device. Specifically, the storage 22 may include memory such as semiconductor memory, and a hard disk drive (HDD). The storage 22 stores a control program therein. The processor executes the control program to control the operation display section 4, the conveyance mechanism 11, the feeding section 12, the image forming section 14, the fixing section 15, and the ejection section 16. The processor controls the image forming section 14 according to a print job, for example. The print job includes printing conditions such as color or monochrome, a layout format, and print number. The layout format indicates the layout of images on the sheet P.

Figure 2:
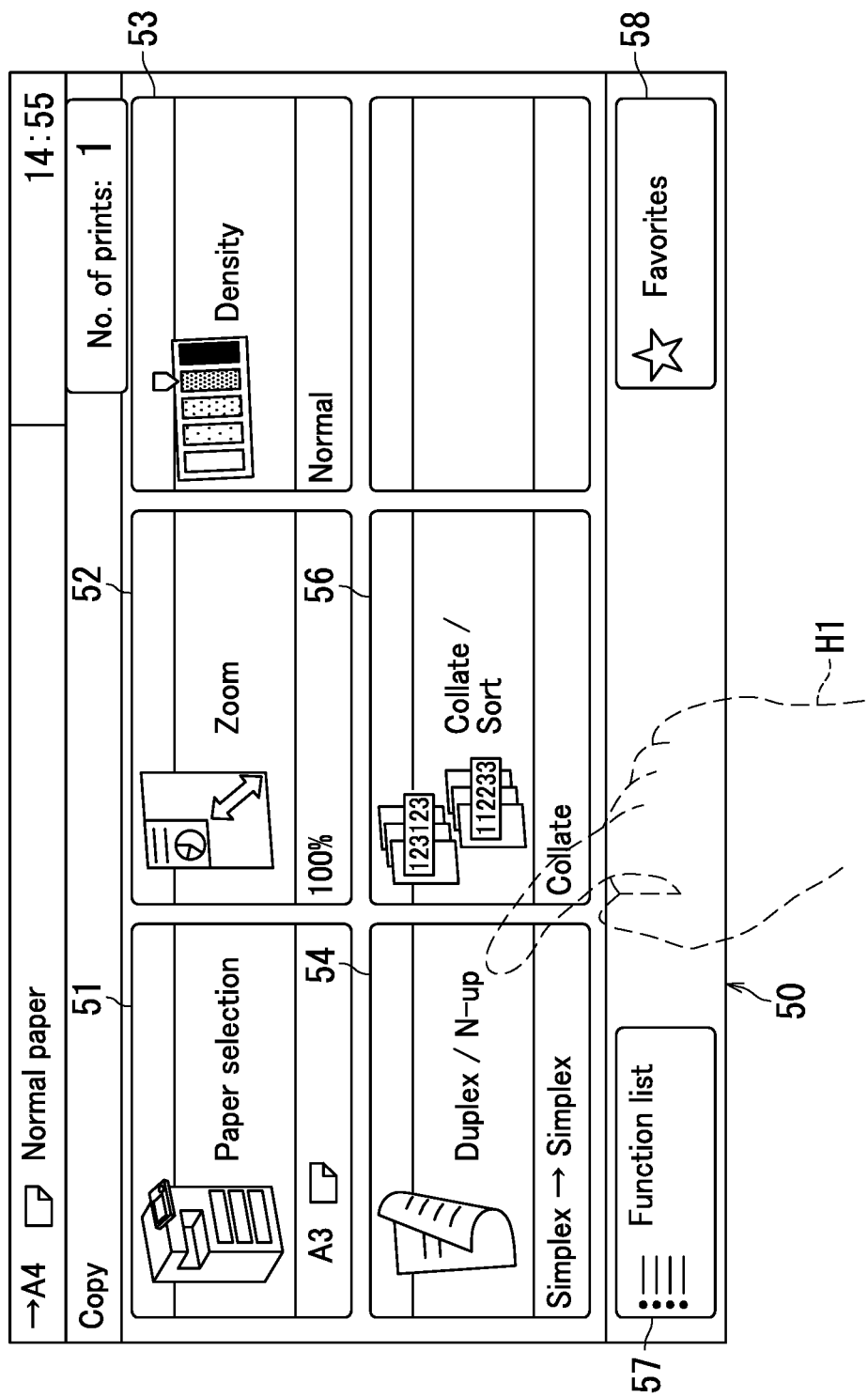
FIG. 2 is a diagram illustrating a copy screen displayed on a touch panel according to the first embodiment.

Next, a copy screen 50 displayed on the touch panel 41 is described with reference to FIG. 2. FIG. 2 is a diagram illustrating the copy screen 50 displayed on the touch panel 41. The copy screen 50 is displayed on the touch panel 41 through operation of the operation button 42 to select the copy function of the image forming apparatus 100. The copy screen 50 displays a paper selection icon 51, a zoom icon 52, a density setting icon 53, a duplex/N-up setting icon 54, a collate/sort setting icon 56, a function list icon 57, and a favorites icon 58.

The user operates the paper selection icon 51 to select the size of the sheet P. The user operates the zoom icon 52 to enlarge or reduce the image to be formed on the sheet P. The user operates the density setting icon 53 to set a copy density. The user operates the duplex/N-up setting icon 54 to set duplex or simplex printing and conditions of page composition such as "2-in-1". The user operates the collate/sort setting icon 56 to set sorting conditions such as whether or not to collate. The user operates the function list icon 57 to display a function list screen on the touch panel 41 which describes various functions. The user operates the favorites icon 58 to display icons on the touch panel 41 that are frequently used by the user.

As illustrated in FIG. 2, the duplex/N-up setting icon 54 is tapped by a finger (forefinger, for example) of a hand H1 of the user. According to this operation, the touch panel 41 displays a screen corresponding to the tapped duplex/N-up setting icon 54. It should be noted that the hand H1 is not displayed on the touch panel 41.

Figure 3:
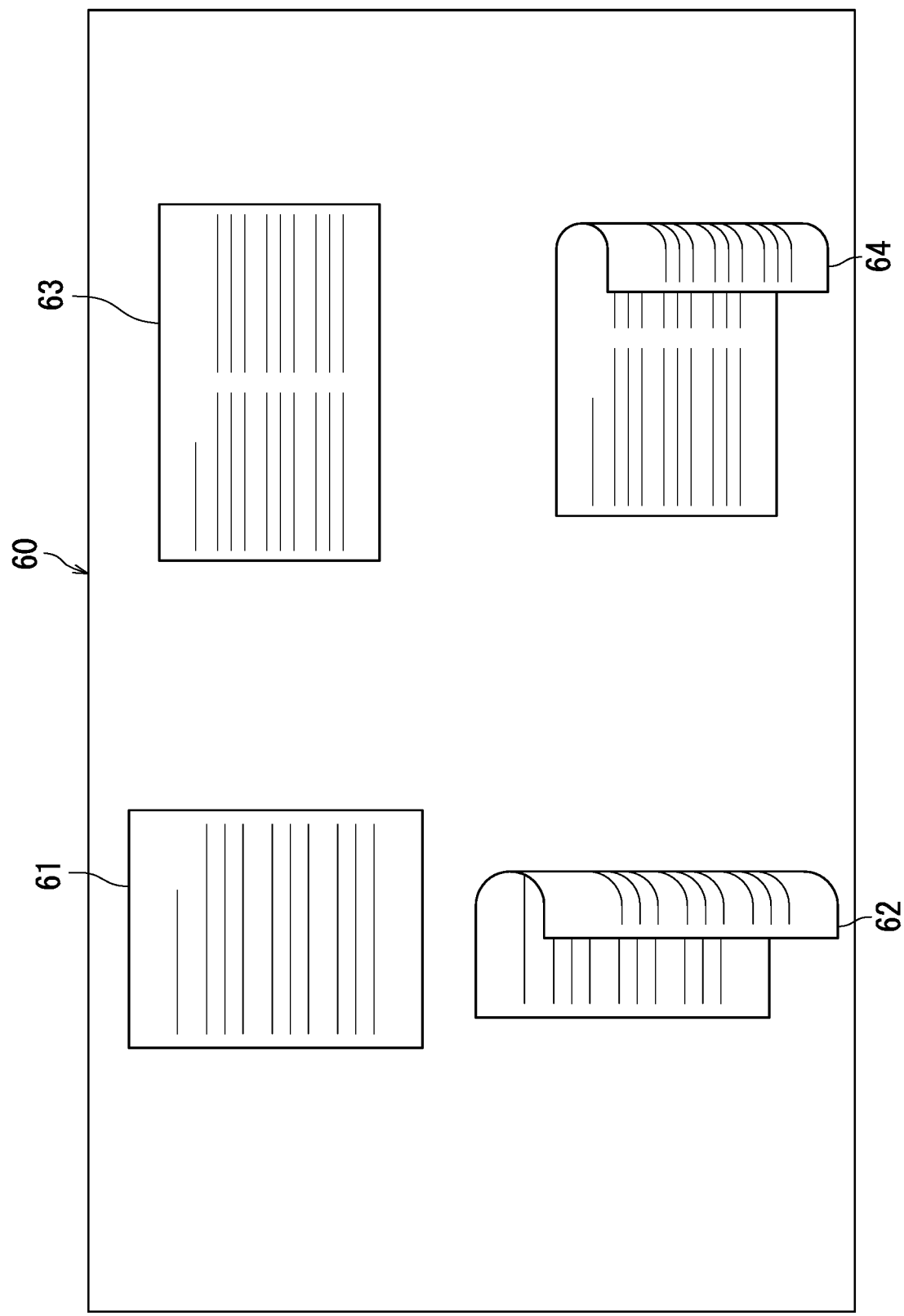
FIG. 3 is a diagram illustrating a setting screen through which a layout format of a print job is set in the first embodiment.

Next, a screen corresponding to the duplex/N-up setting icon 54 is described with reference to FIG. 3. FIG. 3 is a diagram illustrating a setting screen 60 for setting a layout format of a print job. The layout format includes a first layout format, a second layout format, a third layout format, and a fourth layout format.

A first layout icon 61, a second layout icon 62, a third layout icon 63, and a fourth layout icon 64 are displayed in the setting screen 60.

The first layout icon 61 receives touch operation. Through the touch operation on the first layout icon 61, the first layout format is included in the print job. The first layout format is a layout format indicating that one image is arranged on one of the pair of main surfaces of a single sheet P. That is, when the first layout format is assigned to images, one of the images to which the first layout format is assigned is formed on only one side of a single sheet P. The first layout format is also referred to as "simplex printing".

The second layout icon 62 receives touch operation. Through the touch operation on the second layout icon 62, the second layout format is included in the print job. The second layout format is a layout format indicating that one image is arranged on each of the pair of main surfaces of a single sheet P. That is, when the second layout format is assigned to images, an image to which the second layout format is assigned is formed on either of the front and back sides of a single sheet P. The second layout format is also referred to as "duplex printing".

The third layout icon 63 receives touch operation. Through the touch operation on the third layout icon 63, the third layout format is included in the print job. The third layout icon 63 indicates an icon through which the third layout format is assigned to an image. The third layout format is a layout format indicating that two or more images are arranged on one of the pair of main surfaces of a single sheet P. That is, when the third layout format is assigned to images, two or more of the images to which the third layout format is assigned are formed on only one side of a single sheet P. For example, two of the images to which the third layout format is assigned are formed on only one side of a single sheet P. For another example, four of the images to which the third layout format is assigned are formed on only one side of a single sheet P. The third layout format is also referred to as "simplex 2-in-1" or "simplex 4-in-1".

The fourth layout icon 64 receives touch operation. Through the touch operation on the fourth layout icon 64, the fourth layout format is included in the print job. The fourth layout format is a layout format indicating that two or more images are arranged on each of the pair of main surfaces of a single sheet P. That is, when the fourth layout format is assigned to images, two or more of the images to which the fourth layout format is assigned are formed on either side of a single sheet P. For example, two of the images to which the third layout format is assigned are formed on either side of a single sheet P. For another example, four of the images to which the fourth layout format is assigned are formed on either side of a single sheet P. The fourth layout format is also referred to as "duplex 2-in-1" or "duplex 4-in-1".

Next, a process performed by the controller 21 when a plurality of layout formats is set to a single print job is described with reference to FIGS. 3 to 4C. FIGS. 4A to 4C are diagrams illustrating a plurality of sheets P on which images are formed by the image forming apparatus 100 performing the single print job including mutually different layout formats. FIGS. 4A to 4C illustrate sheets PA1 to PA8 on which images are formed by the image forming apparatus 100.

FIG. 4A is a diagram illustrating the sheet PA1 on which an image is formed on either side thereof. Images G1 and G2 are formed on the sheet PA1. Each of the images G1 and G2 is an image expressed by image data of one page. Specifically, the image G1 is formed on one of the pair of main surfaces of the sheet PA1. The image G2 is formed on the other of the pair of main surfaces of the sheet PA1. The second layout format is set to the images G1 and G2.

FIG. 4B is a diagram illustrating the sheet PA2 on which an image is formed on either side thereof. Images G5 and G7 are formed on the sheet PA2. Specifically, the image G5 is formed on one of the pair of main surfaces of the sheet PA2. The image G7 is formed on the other of the pair of main surfaces of the sheet PA2. The second layout format is set to the images G5 and G7.

FIG. 4C is a diagram illustrating the sheets PA3 to PA8 on each of which an image is formed on one side thereof. An image G3 is formed on the sheet PA3. An image G4 is formed on the sheet PA4. An image G6 is formed on the sheet PA5. An image G8 is formed on the sheet PA6. An image G9 is formed on the sheet PA7. An image G10 is formed on the sheet PA8. The first layout format is set to the images G3, G4, G6, G8, G9, and G10.

In the setting screen 60 illustrated in FIG. 3, mutually different layout formats can be set to a single print job. That is, a single print job includes an instruction to form the images on the sheets P according to mutually different layout formats. Therefore, it is not necessary to instruct a print job for each of the mutually different layout formats. As a result, convenience for the user in instructing a print job is improved.

A conventional image forming apparatus requires the user to instruct the image forming apparatus to perform a print job for N-up printing of pages (first and second pages) and a print job for simplex printing of a page (third page) when compositing the images of the first and second pages included in a single document for printing on one sheet while printing the image of the third page on one side of another sheet.

However, a single print job performed by the image forming apparatus 100 of the present embodiment may include both the first layout format and the second layout format, for example. The controller 21 controls the image forming apparatus 100 so as to form a plurality of images on a plurality of sheets P according to the first layout format and the second layout format included in a single print job. That is, by performing a single print job, the image forming apparatus 100 can form images formed on a sheet P according to the first layout format and images formed on a sheet P according to the second layout format.

Next, a process for including a plurality of mutually different layout formats in a single print job is described with reference to FIGS. 3 to 5.

Figure 5:
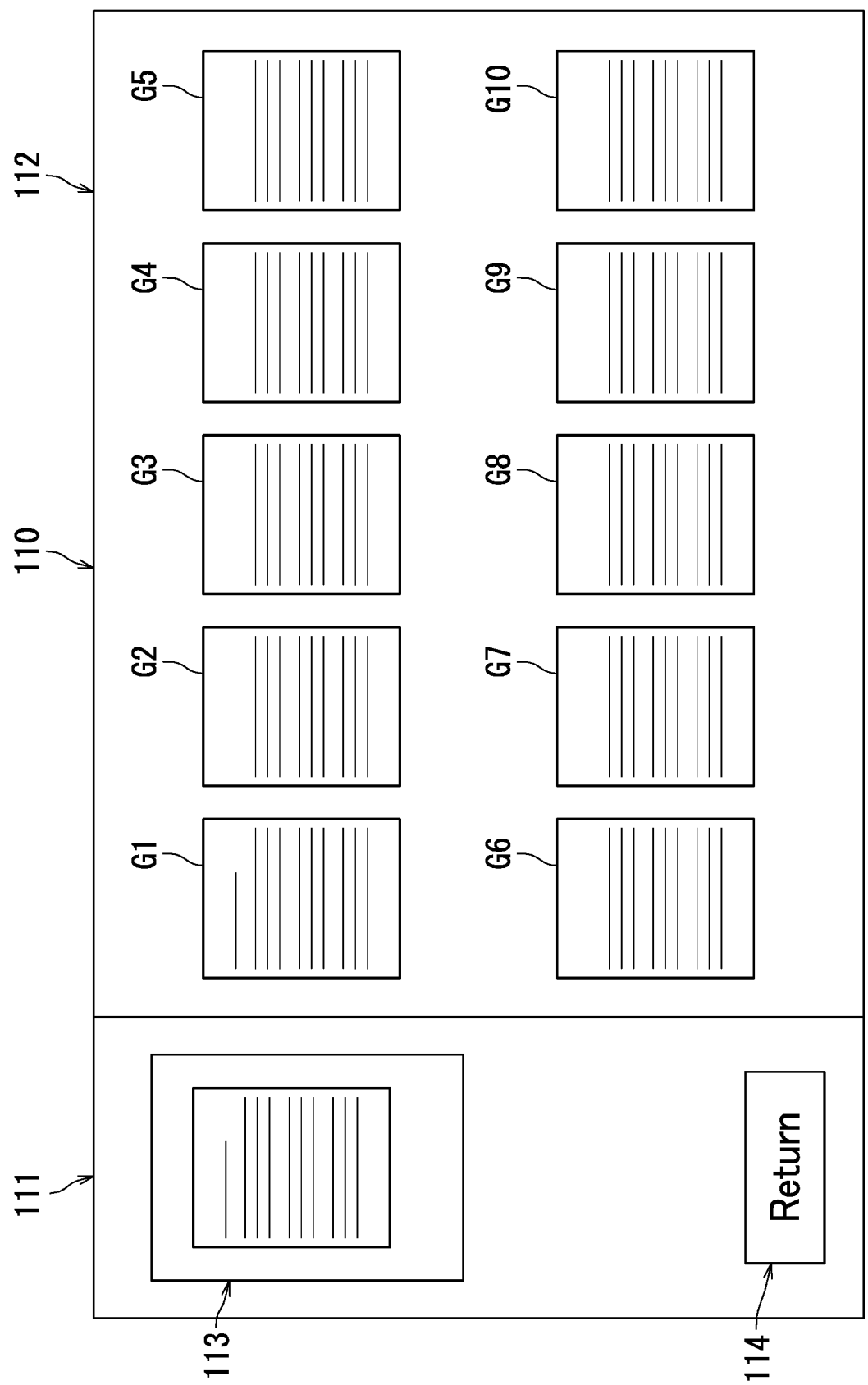
FIG. 5 is a diagram illustrating a first selection screen for selecting images to be assigned a first layout format in the first embodiment.

FIG. 5 is a diagram illustrating a first selection screen 110 for selecting images to be assigned the first layout format. As illustrated in FIG. 5, the first selection screen 110 includes a first display area 111 and a second display area 112. Through touch operation on the first layout icon 61 illustrated in FIG. 3, the first selection screen 110 illustrated in FIG. 5 is displayed on the operation display section 4.

The first display area 111 displays a return button 114 and an image 113 indicating that the first selection screen 110 is being displayed. The return button 114 is a button for returning to the setting screen 60 illustrated in FIG. 3 when the assignment of the first layout format to the images is completed.

The second display area 112 displays a plurality of images. The images include the images G1 to G10. Each of the images is an image expressed by image data of a single page.

Each of the images G1 to G10 in the second display area 112 illustrated in FIG. 5 receives touch operation. Based on the touch operation, the controller 21 assigns the first layout format to one or more of the images. Specifically, the controller 21 assigns the first layout format to images which have received touch operation.

The controller 21 then assigns a layout format differing from the first layout format among the layout formats to one or more of the images. The controller 21 also controls the image forming section 14 so as to form the images on a plurality of sheets P according to the first layout format and the layout format differing from the first layout format. Therefore, the user need not instruct a print job including the first layout format and a print job including the layout format differing from the first layout format. As a result, the convenience for the user improves in forming images with the image forming section 14 according to a plurality of layout formats including the first layout format equivalent to simplex printing.

As illustrated in FIG. 4, for example, the images G3 and G4 receive touch operation in the first selection screen 110 when a single print job including the first layout format and the second layout format is performed. The controller 21 assigns the first layout format to the images G3 and G4 based on the touch operation. The controller 21 then assigns the second layout format to the images which received touch operation in the selection screen for selecting the second layout format. The controller 21 also controls the image forming section 14 so as to form the images on a plurality of sheets P according to the first layout format and the second layout format. Therefore, the image forming section 14 can perform simplex printing and duplex printing in a single print job. It should be noted the first layout format may be assigned to images for which the user has not specified a layout format.

Next, a process for including the second layout format and a layout format differing from the second layout format in a single print job is described with reference to FIGS. 3 to 6.

Figure 6:
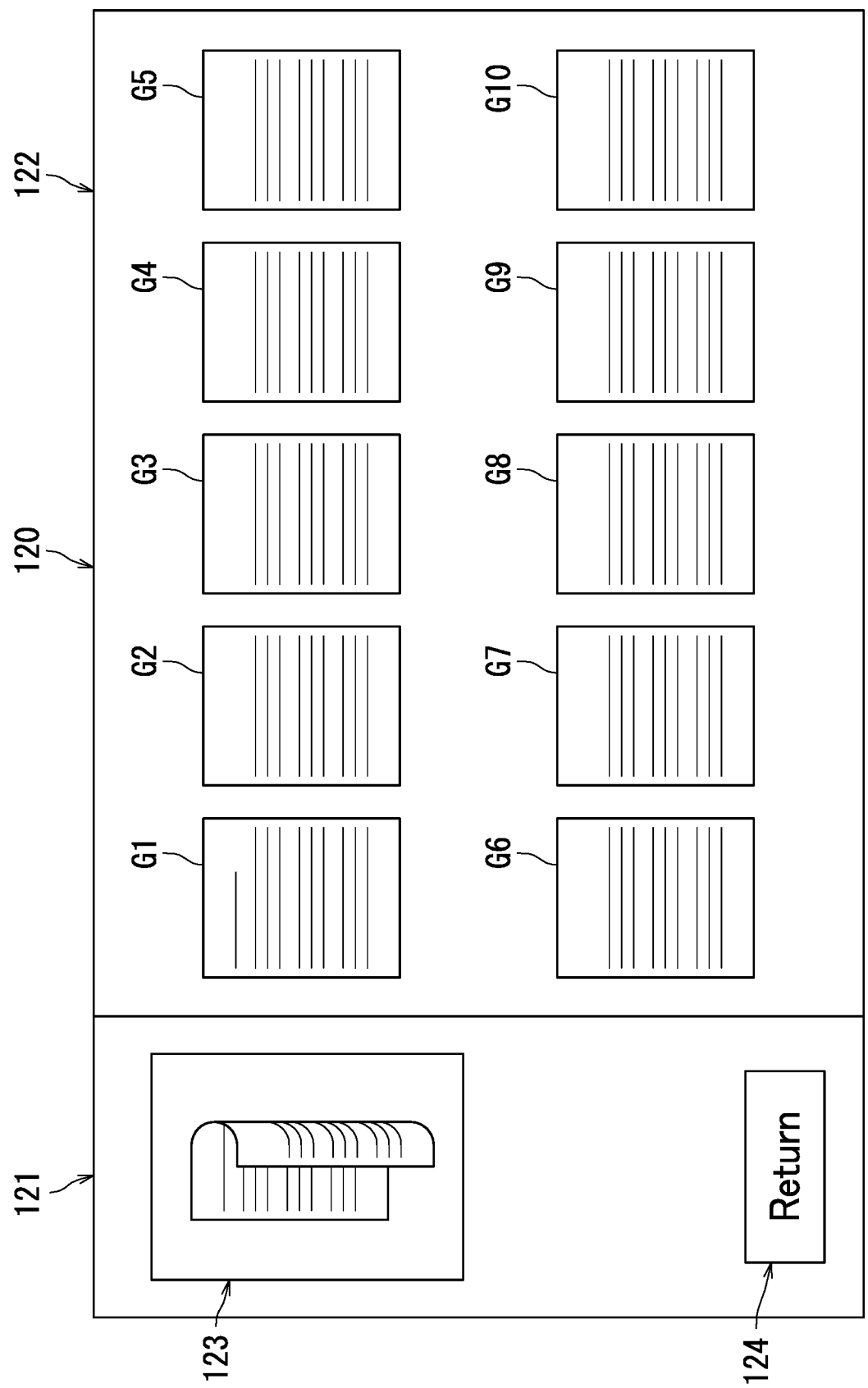
FIG. 6 is a diagram illustrating a second selection screen for selecting images to be assigned a second layout format in the first embodiment.

FIG. 6 is a diagram illustrating a second selection screen 120 for selecting images to be assigned the second layout format. The second selection screen 120 includes a first display area 121 and a second display area 122. The first display area 121 displays a return button 124 and an image 123 which indicates that the second selection screen 120 is being displayed. The second display area 122 displays the images G1 to G10. Through touch operation on the second layout icon 62 illustrated in FIG. 3, the second selection screen 120 illustrated in FIG. 6 is displayed on the operation display section 4.

Each of the images G1 to G10 in the second display area 122 receives touch operation. Based on the touch operation, the controller 21 assigns the second layout format to one or more of the images. Specifically, the controller 21 assigns the second layout format to images which have received touch operation.

The controller 21 then assigns a layout format differing from the second layout format among the layout formats to one or more of the images. The controller 21 also controls the image forming section 14 so as to form the images on a plurality of sheets P according to the second layout format and the layout format differing from the second layout format. Therefore, the user need not instruct a print job including the second layout format and a print job including the layout format differing from the second layout format. As a result, the convenience for the user improves in forming images with the image forming section 14 according to a plurality of layout formats including the second layout format which is equivalent to duplex printing.

For example, in a case where a single print job including the first layout format and the second layout format is performed as illustrated in FIGS. 4A to 4C, the images G1, G2, G5, and G7 receive touch operation in the second selection screen 120. The controller 21 assigns the second layout format to the images G1, G2, G5, and G7 based on the touch operation. It should be noted that the second layout format is assigned in the order in which the images are touched. The controller 21 then assigns the first layout format to the images which received touch operation in the first selection screen 110. The controller 21 also controls the image forming section 14 so as to form the images on a plurality of sheets P according to the second layout format and the first layout format. Therefore, the image forming section 14 can perform duplex printing and simplex printing in a single print job.

Next, a process of including the third layout format and a layout format differing from the third layout format in a single print job is described with reference to FIGS. 3, 7, and 8.

Figure 7:
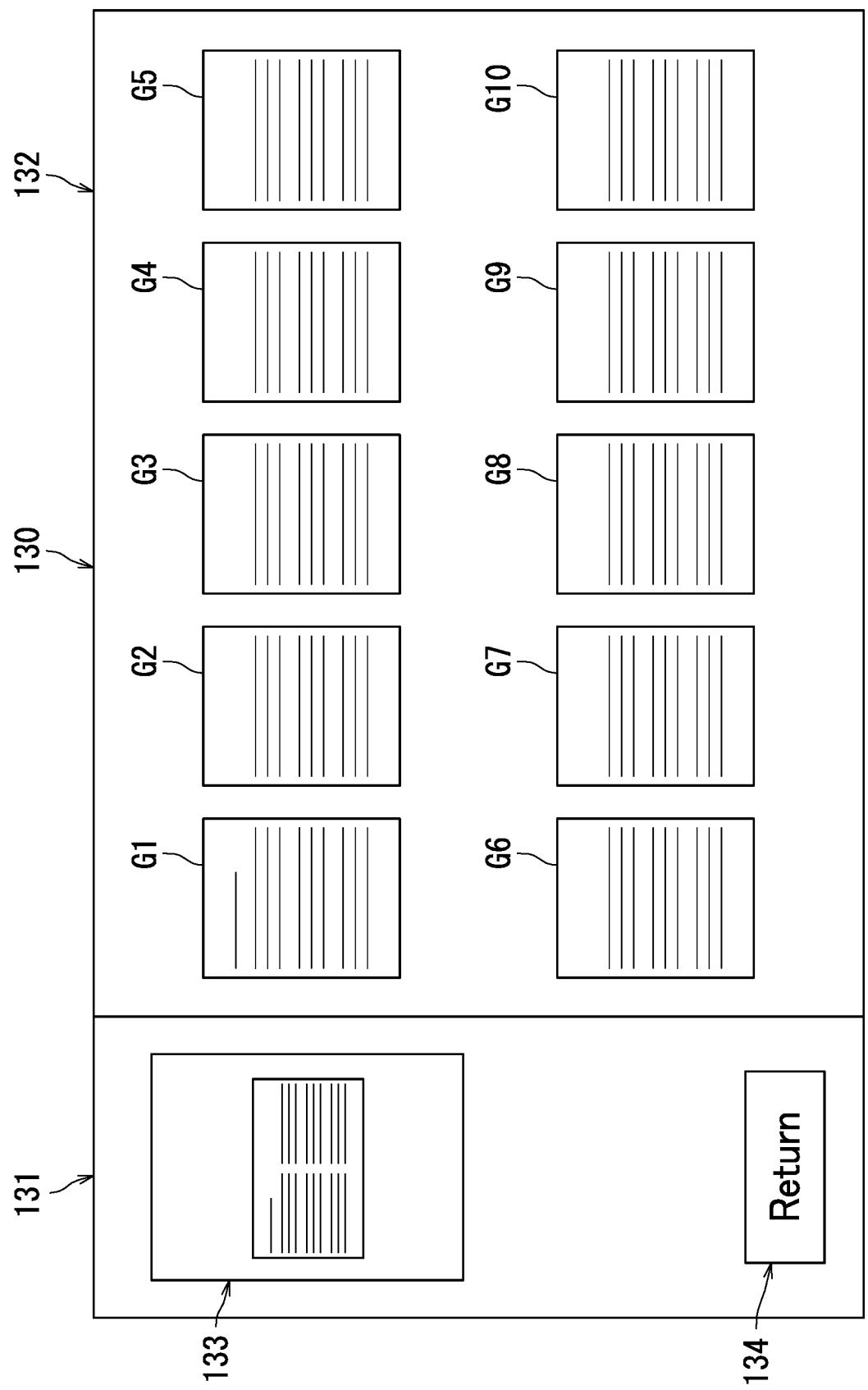
FIG. 7 is a diagram illustrating a third selection screen for selecting images to be assigned a third layout format in the first embodiment.

FIG. 7 is a diagram illustrating a third selection screen 130 for selecting images to be assigned the third layout format. The third selection screen 130 includes a first display area 131 and a second display area 132. The first display area 131 displays a return button 134 and an image 133 which indicates that the third selection screen 130 is being displayed. The images G1 to G10 are displayed in the second display area 132. Through touch operation on the third layout icon 63 illustrated in FIG. 3, the third selection screen 130 illustrated in FIG. 7 is displayed on the operation display section 4.

Figure 8C:
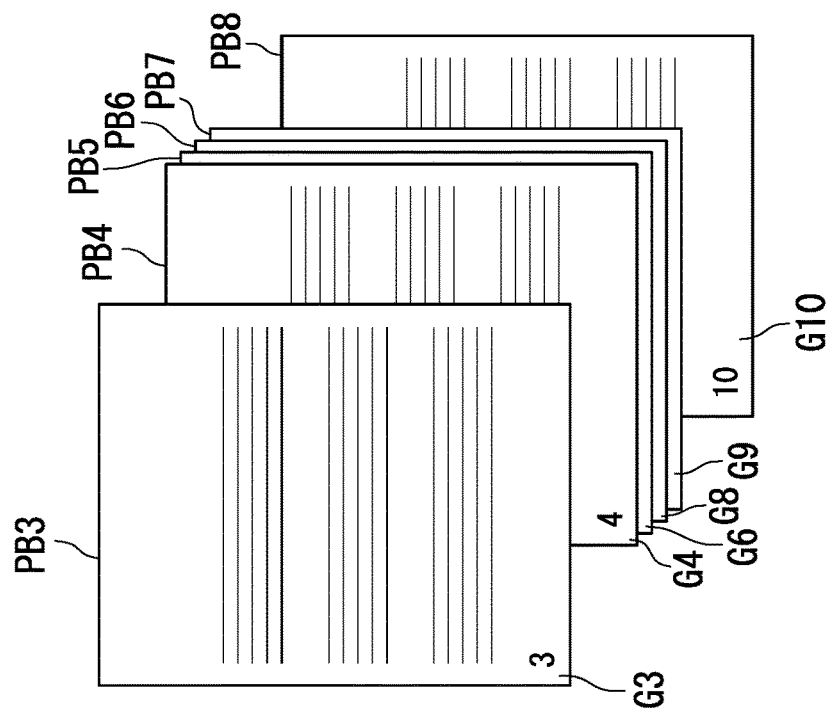
FIG. 8C is another diagram illustrating a plurality of sheets on each of which an image is formed on one side thereof in the first embodiment.
Figure 8B:
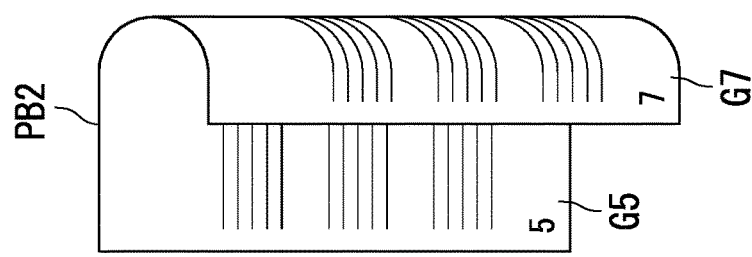
FIG. 8B is a diagram illustrating a sheet on which an image is formed on either side thereof in the first embodiment.
Figure 8A:
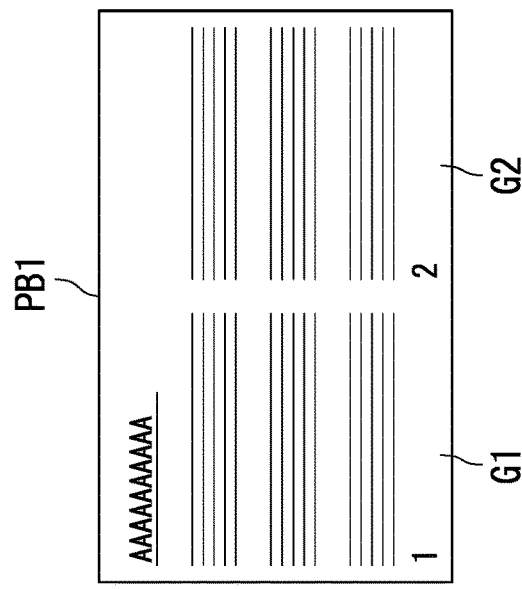
FIG. 8A is a diagram illustrating a sheet on which a plurality of images is formed on one side thereof in the first embodiment.

FIGS. 8A to 8C are diagrams illustrating a plurality of sheets P on which images are formed by the image forming apparatus 100 performing a single print job including the first layout format, the second layout format, and the third layout format. FIGS. 8A to 8C illustrate sheets PB1 to PB8 on which images are formed by the image forming apparatus 100.

FIG. 8A is a diagram illustrating the sheet PB1 on which a plurality of images is formed on one side thereof. The images G1 and G2 are formed on the sheet PB1. Specifically, the images G1 and G2 are formed on one of the pair of main surfaces of the sheet PB1. The third layout format is set to the images G1 and G2.

FIG. 8B is a diagram illustrating the sheet PB2 on which an image is formed on either side thereof. The image G5 is formed on one of the pair of main surfaces of the sheet PB2. The image G7 is formed on the other of the pair of main surfaces of the sheet PB2. The second layout format is set to the images G5 and G7.

FIG. 8C is a diagram illustrating the sheets PB3 to PB8 on each of which an image is formed on one side thereof. The image G3 is formed on the sheet PB3. The image G4 is formed on the sheet PB4. The image G6 is formed on the sheet PB5. The image G8 is formed on the sheet PB6. The image G9 is formed on the sheet PB7. The image G10 is formed on the sheet PB8. The first layout format is set to the images G3, G4, G6, G8, G9, and G10.

As illustrated in FIG. 7, each of the images G1 to G10 displayed in the second display area 132 of the third layout format receives touch operation. Based on the touch operation, the controller 21 assigns the third layout format to one or more of the images. Specifically, the controller 21 assigns the third layout format to images which have received touch operation.

The controller 21 then assigns a layout format differing from the third layout format among the layout formats to one or more of the images. The controller 21 also controls the image forming section 14 so as to form the images on a plurality of sheets P according to the third layout format and the layout format differing from the third layout format. Therefore, the user need not instruct a print job including the third layout format and a print job including the layout format differing from the third layout format. As a result, the convenience for the user improves in forming images with the image forming section 14 according to a plurality of layout formats including the third layout format which is equivalent to simplex 2-in-1.

Next, a process for including the fourth layout format and a layout format differing from the fourth layout format in a single print job is described with reference to FIGS. 3 and 9 to 10C.

Figure 9:
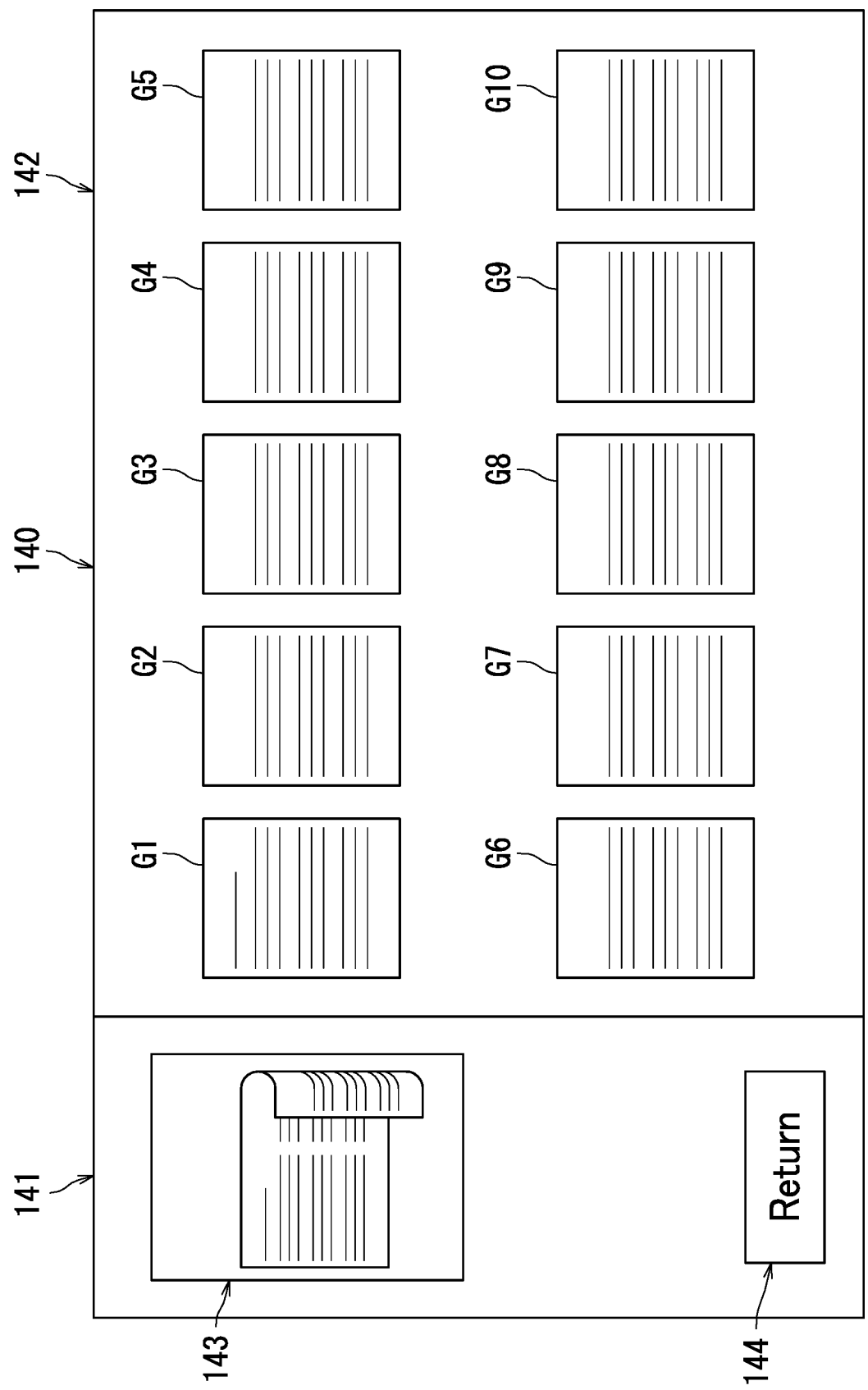
FIG. 9 is a diagram illustrating a fourth selection screen for selecting images to be assigned a fourth layout format in the first embodiment.

FIG. 9 is a diagram illustrating a fourth selection screen 140 for selecting images to be assigned the fourth layout format. The fourth selection screen 140 includes a first display area 141 and a second display area 142. The first display area 141 displays a return button 144 and an image 143 indicating that the fourth selection screen 140 is being displayed. The second display area 142 displays the images G1 to G10. Through touch operation on the fourth layout icon 64 illustrated in FIG. 3, the fourth selection screen 140 illustrated in FIG. 8 is displayed on the operation display section 4.

Figure 10A:
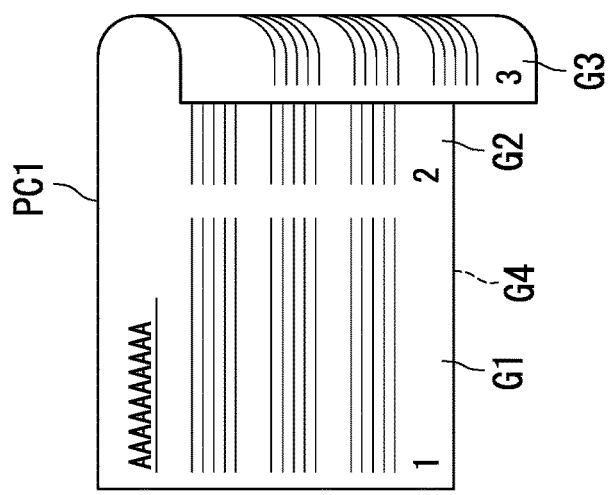
FIG. 10A is a diagram illustrating a sheet on which a plurality of images is formed on either side thereof in the first embodiment.
Figure 10B:
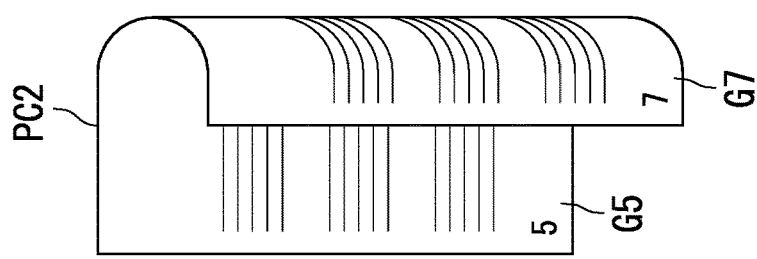
FIG. 10B is a diagram illustrating a sheet on which an image is formed on either side thereof in the first embodiment.
Figure 10C:
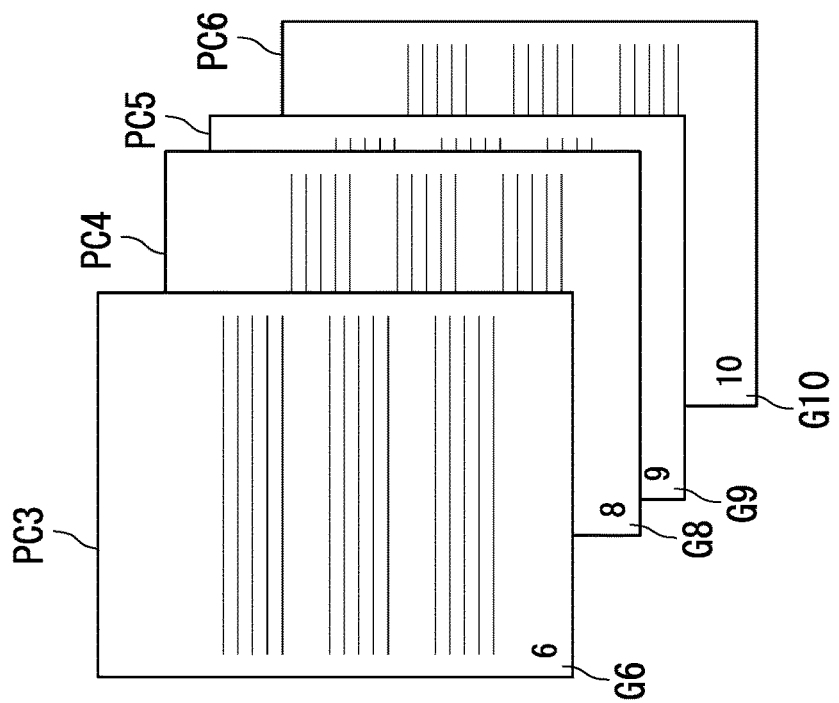
FIG. 10C is another diagram illustrating a plurality of sheets on each of which an image is formed on one side thereof in the first embodiment.

FIGS. 10A to 10C are diagrams illustrating a plurality of sheets P on which images are formed by the image forming apparatus 100 performing a single print job including the first layout format, the second layout format, and the fourth layout format. FIGS. 10A to 10C illustrate sheets PC1 to PC6 on which images are formed by the image forming apparatus 100.

FIG. 10A is a diagram illustrating the sheet PC1 on which a plurality of images is formed on either side thereof. The images G1 to G4 are formed on the sheet PC1. Specifically, the images G1 and G2 are formed on one of the pair of main surfaces of the sheet PC1. The images G3 and G4 are formed on the other of the pair of main surfaces of the sheet PC1. The fourth layout format is set to the images G1 to G4.

FIG. 10B is a diagram illustrating the sheet PC2 on which an image is formed on either side thereof. The image G5 is formed on one of the pair of main surfaces of the sheet PC2. The image G7 is formed on the other of the pair of main surfaces of the sheet PC2. The second layout format is set to the images G5 and G7.

FIG. 10C is a diagram illustrating the sheets PC3 to PC6 on each of which an image is formed on one side thereof. The image G6 is formed on the sheet PC3. The image G8 is formed on the sheet PC4. The image G9 is formed on the sheet PC5. The image G10 is formed on the sheet PC6. The first layout format is set to the images G6, G8, G9, and G10.

As illustrated in FIG. 9, each of the images G1 to G10 displayed in the second display area 142 of the fourth layout format receives touch operation. Based on the touch operation, the controller 21 assigns the fourth layout format to one or more of the images. Specifically, the controller 21 assigns the fourth layout format to images which have received touch operation.

The controller 21 then assigns a layout format differing from the fourth layout format among the layout formats to one or more of the images. The controller 21 also controls the image forming section 14 so as to form the images on a plurality of sheets P according to the fourth layout format and the layout format differing from the fourth layout format. Therefore, the user need not instruct a print job including the fourth layout format and a print job including the layout format differing from the fourth layout format. As a result, the convenience for the user improves in forming images with the image forming section 14 according to a plurality of layout formats including the fourth layout format which is equivalent to duplex 2-in-1.

Figure 11:
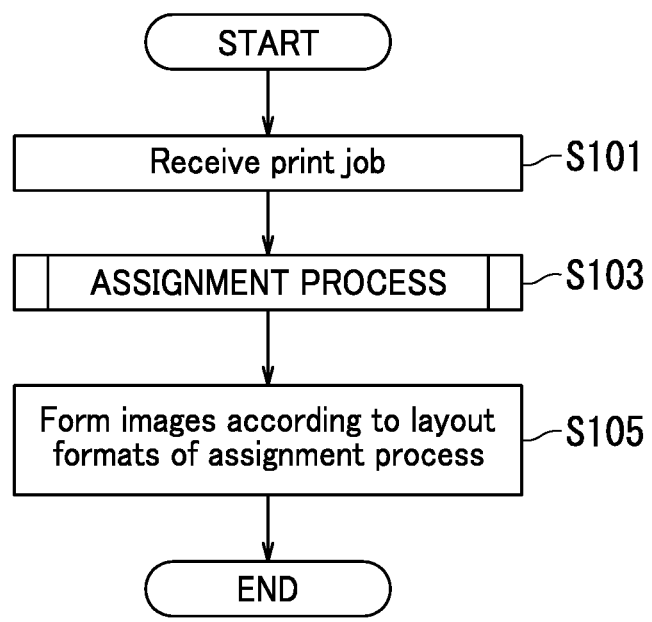
FIG. 11 is a flowchart depicting a process performed by a controller of the first embodiment.

Next, the process performed by the controller 21 is described with reference to FIGS. 1 to 11. FIG. 11 is a flowchart depicting the process performed by the controller 21. The process performed by the controller 21 includes Steps S101 to S105.

In Step S101, the controller 21 is on standby until receiving a print job. The process advances to Step S103.

In Step S103, the controller 21 performs an assignment process. The assignment process is described later with reference to FIG. 12. The process advances to Step S105.

In Step S105, the controller 21 controls the image forming section 14 so as to form images on sheets P based on the layout formats assigned in the assignment process. The process ends.

Figure 12:
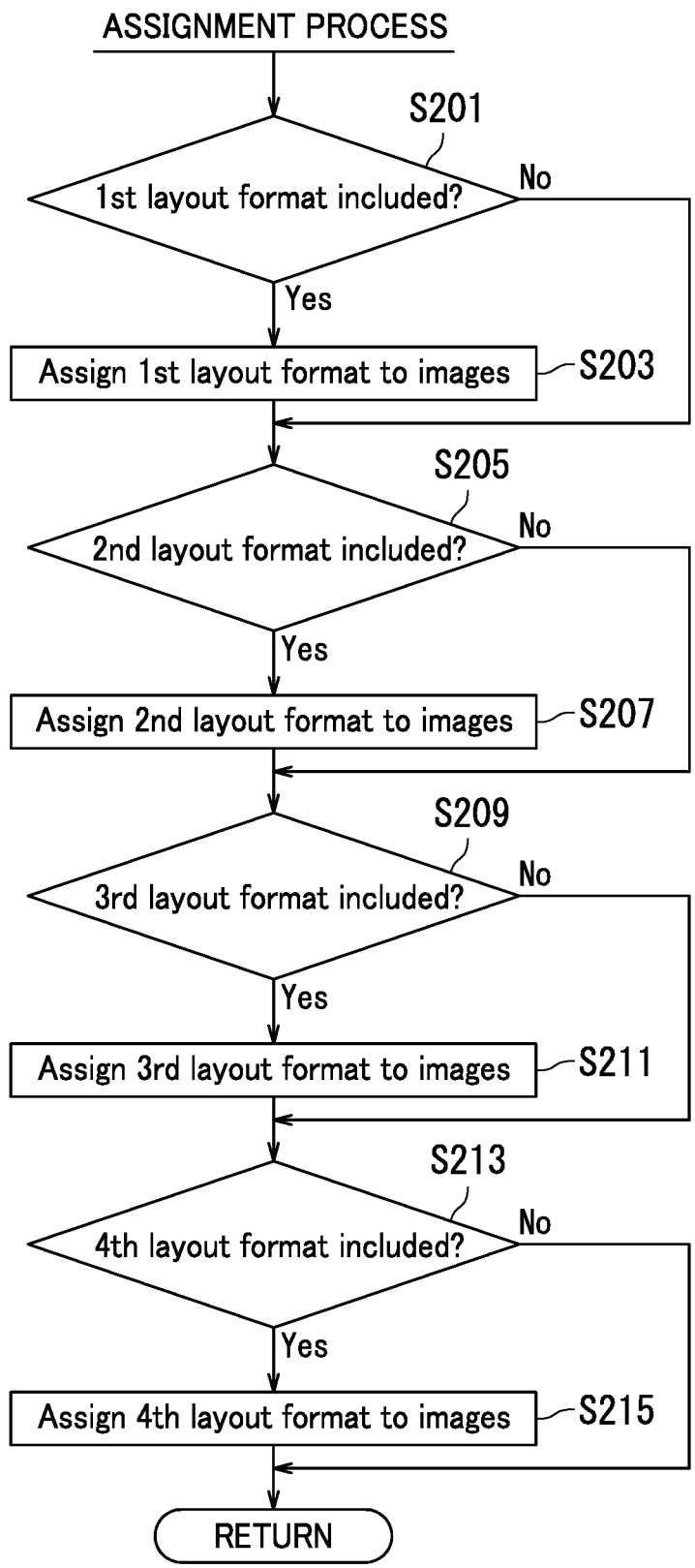
FIG. 12 is a flowchart depicting an assignment process performed by the controller of the first embodiment.

Next, the assignment process is described in detail with reference to FIG. 12. FIG. 12 is a flowchart depicting the assignment process performed by the controller 21. The assignment process includes Steps S201 to S215.

In Step S201, the controller 21 determines whether or not the print job includes the first layout format. When the print job does not include the first layout format (No in Step S201), the process advances to Step S205. When the print job does include the first layout format (Yes in Step S201), the process advances to Step S203.

When an affirmative determination is made in Step S201, the controller 21 assigns the first layout format to images in Step S203. Specifically, the controller 21 assigns the first layout format to the images selected in the first selection screen 110. The process advances to Step S205.

When a negative determination is made in Step S201, or after the first layout format has been assigned to the images in Step S203, the controller 21 determines whether or not the second layout format is included in the print job in Step S205. When the print job does not include the second layout format (No in Step S205), the process advances to Step S209. When the print job does include the second layout format (Yes in Step S205), the process advances to Step S207.

When an affirmative determination is made in Step S205, the controller 21 assigns the second layout format to images in Step S207. Specifically, the controller 21 assigns the second layout format to the images selected in the second selection screen 120. The process advances to Step S209.

When a negative determination is made in Step S205, or after the second layout format has been assigned to the images in Step S207, the controller 21 determines whether or not the third layout format is included in the print job in Step S209. When the print job does not include the third layout format (No in Step S209), the process advances to Step S213. When the print job does include the third layout format (Yes in Step S209), the process advances to Step S211.

When an affirmative determination is made in Step S209, the controller 21 assigns the third layout format to images in Step S211. Specifically, the controller 21 assigns the third layout format to the images selected in the third selection screen 130. The process advances to Step S213.

When a negative determination is made in Step S209, or after the third layout format has been assigned to the images in Step S211, the controller 21 determines whether or not the fourth layout format is included in the print job in Step S213. When the print job does not include the fourth layout format (No in Step S213), the process advances to Step S105 illustrated in FIG. 11. When the print job does include the fourth layout format (Yes in Step S213), the process advances to Step S215.

When an affirmative determination is made in Step S213, the controller 21 assigns the fourth layout format to images in Step S215. Specifically, the controller 21 assigns the fourth layout format to the images selected in the fourth selection screen 140. The process advances to Step S105 illustrated in FIG. 11.

Second Embodiment

The following describes a process performed by the controller 21 according to a second embodiment of the present disclosure with reference to FIGS. 1 and 13A to 14B.

The process performed by the controller 21 according to the second embodiment includes a process of assigning a layout format based on a keyword KE. Other configuration of the image forming apparatus 100 according to the second embodiment is the same as the configuration of the image forming apparatus 100 according to the first embodiment, and description thereof is therefore omitted. In the following, points of difference between the second and first embodiments are mainly described.

Figure 13C:
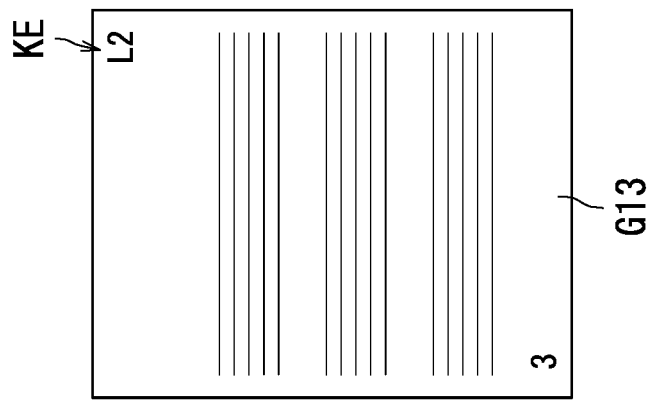
FIG. 13C is a diagram illustrating yet another image read by the image reading unit of the second embodiment.
Figure 13B:
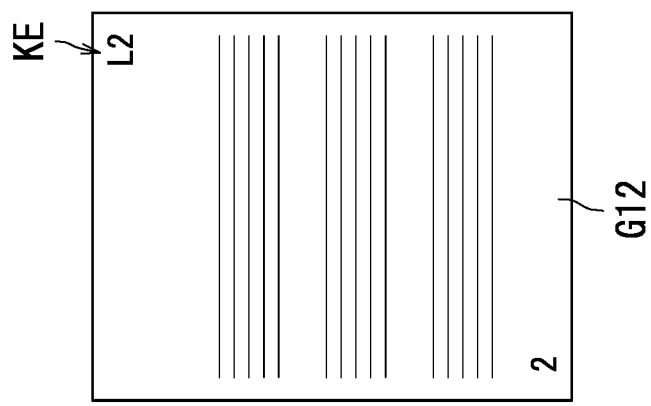
FIG. 13B is a diagram illustrating another image read by the image reading unit of the second embodiment.
Figure 13A:
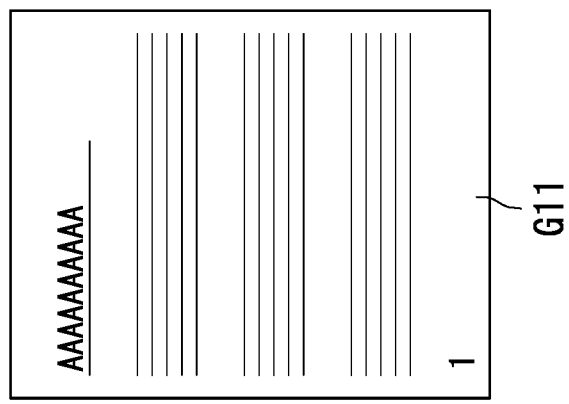
FIG. 13A is a diagram illustrating an image read by an image reading unit according to a second embodiment of the present disclosure.

FIGS. 13A to 13C are diagrams illustrating images read by the image reading unit 2. The image reading unit 2 recognizes symbols. Any known method of symbol recognition such as optical character recognition (OCR) may be used.

FIG. 13A is a diagram illustrating an image G11 read by the image reading unit 2. FIG. 13B is a diagram illustrating an image G12 read by the image reading unit 2. The image G12 illustrated in FIG. 13B includes the keyword KE. The keyword KE indicates a layout format. The keyword KE is a symbol, for example. The symbol includes a character or a character string. The image G12 includes the keyword KE. The symbol exhibiting the keyword KE is "L2", for example. The symbol L2 indicates the second layout format. FIG. 13C is a diagram illustrating an image G13 read by the image reading unit 2. The image G13 illustrated in FIG. 13C includes the keyword KE.

Figure 14B:
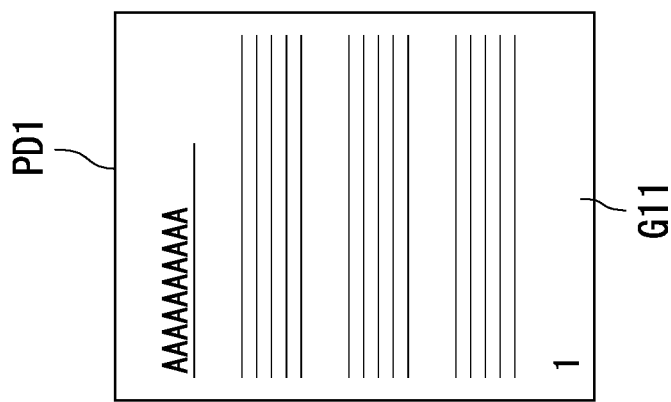
FIG. 14B is a diagram illustrating a sheet on which an image is formed on either side thereof in the second embodiment.
Figure 14A:
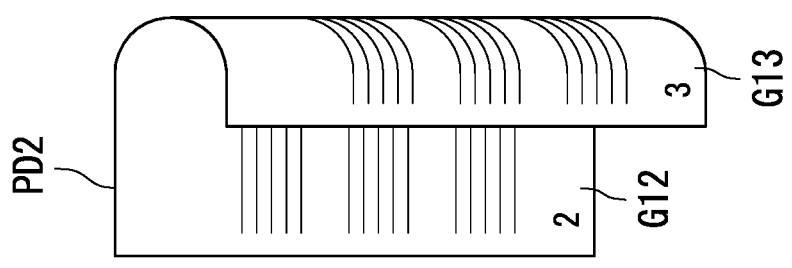
FIG. 14A is a diagram illustrating a sheet on which an image is formed on one side thereof in the second embodiment.

FIGS. 14A and 14B are diagrams illustrating sheets PD1 and PD2 on which images are formed by the image forming section 14 based on the keyword KE. FIGS. 14A and 14B illustrate the sheets PD1 and PD2 on which images are formed by the image forming apparatus 100.

FIG. 14A is a diagram illustrating the sheet PD1 on which an image is formed on one side thereof. The image G11 illustrated in FIG. 13 is formed on the sheet PD1. The first layout format is assigned to the image G11.

FIG. 14B is a diagram illustrating the sheet PD2 on which an image is formed on either side thereof. The image G12 is formed on one of the pair of main surfaces of the sheet PD2. The image G13 is formed on the other of the pair of main surfaces of the sheet PD2. The second layout format is assigned to the images G12 and G13.

The controller 21 of the second embodiment detects the keyword KE from each of the images. The controller 21 then assigns the layout format indicated by the keyword KE among the layout formats to images including the keyword KE. The controller 21 also assigns a layout format differing from the layout format indicated by the keyword KE among the layout formats to one or more of the images. The controller 21 controls the image forming section 14 so as to form the images on a plurality of sheets P according to the layout format indicated by the keyword KE and the layout format differing therefrom. As a result, work to include a layout format in a print job can be omitted and the convenience for the user can be further improved.

Figure 15:
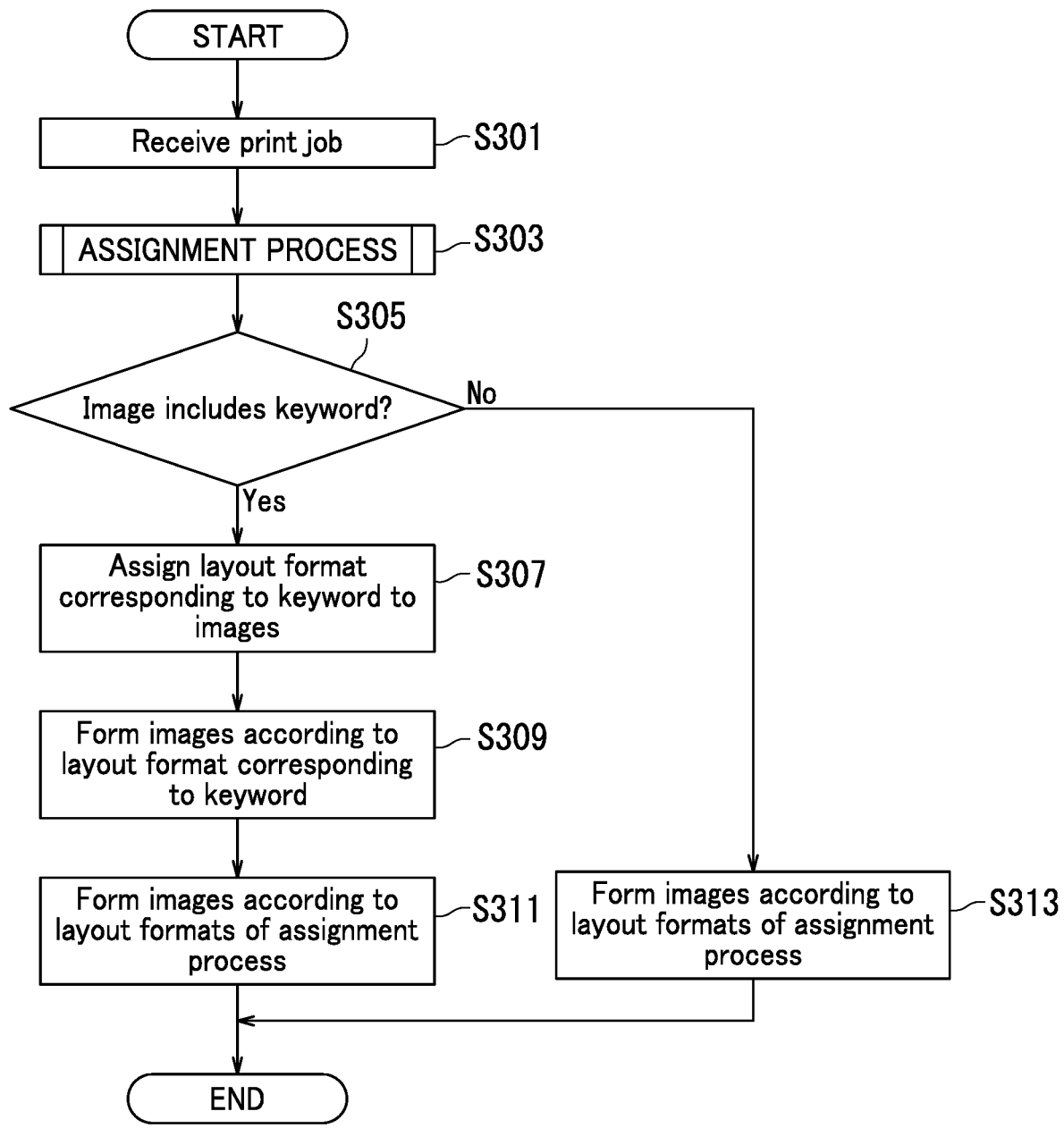
FIG. 15 is a flowchart depicting a process performed by the controller of the second embodiment.

The following describes the process performed by the controller 21 of the second embodiment with reference to FIGS. 1 and 13A to 15. FIG. 15 is a flowchart depicting the process performed by the controller 21 of the second embodiment. The process performed by the controller 21 includes Steps S301 to S313.

In Step S301, the controller 21 is on standby until receiving a print job. The process advances to Step S303.

In Step S303, the controller 21 performs an assignment process. The assignment process is the same as the process described with reference to FIG. 12, and description thereof is therefore omitted. The process advances to Step S305.

In Step S305, the controller 21 determines whether or not the keyword KE is included in each of a plurality of images. When none of the images include the keyword KE (No in Step S305), the process advances to Step S313. When any of the images includes the keyword KE (Yes in Step S305), the process advances to Step S307.

When an affirmative determination is made in Step S305, the controller 21 assigns one of the layout formats to images including the keyword KE in Step S307. Specifically, the controller 21 assigns the layout format corresponding to the keyword KE to the images including the keyword KE. The process advances to Step S309.

In Step S309, the controller 21 controls the image forming section 14 so as to form the images on sheets P according to the layout format corresponding to the keyword KE. The process advances to Step S311.

In Step S311, the controller 21 controls the image forming section 14 so as to form images differing from the images formed in Step S309 on sheets P based on the layout formats assigned in the assignment process of Step S303. The process ends.

When a negative determination is made in Step S305, the controller 21 controls the image forming section 14 so as to form images on sheets P in Step S313 based on the layout formats assigned in the assignment process of Step S303. The process ends.

It should be noted that the controller 21 may assign the third layout format among the layout formats when not detecting the keyword KE from an image. Furthermore, the controller 21 assigns a layout format differing from the third layout format among the layout formats to one or more of the images. The controller 21 controls the image forming section 14 so as to form the images on a plurality of sheets P according to the third layout format and the layout format differing from the third layout format. Therefore, simplex 2-in-1 image formation can be performed on a sheet P when the image does not include a symbol. As a result, work to include a layout format in a print job can be omitted and the convenience for the user can be further improved.

Third Embodiment

The following describes a process performed by the controller 21 according to a third embodiment of the present disclosure with reference to FIGS. 1 and 16A to 17D.

The process performed by the controller 21 according to the third embodiment includes a process of assigning a layout format to images including a title. Other configuration of the image forming apparatus 100 according to the third embodiment is the same as the configuration of the image forming apparatus 100 according to the first embodiment, and description thereof is therefore omitted. In the following, points of difference between the third and first embodiments are mainly described.

FIGS. 16A to 16F are diagrams illustrating images read by the image reading unit 2.

Figure 16A:
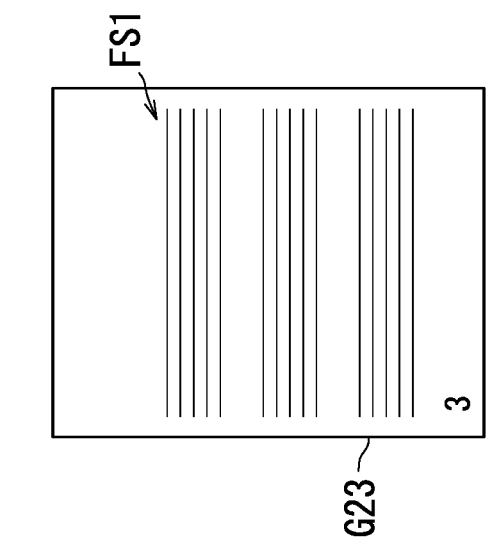
FIG. 16A is a diagram illustrating an image read by the image reading unit according to a third embodiment of the present disclosure.

FIG. 16A is a diagram illustrating an image G21 read by the image reading unit 2. The image G21 includes a plurality of character strings with different font sizes. The image G21 includes a character string FS1 of a first size and a character string FS2 of a second size. The character string FS2 of the second size has a different font size than the character string FS1 of the first size. The character string FS2 of the second size is a character string of a larger font size than the character string FS1 of the first size. The character string FS2 of the second size is a document title, for example. The document title is "AAAAAAAAAA".

Figure 16B:
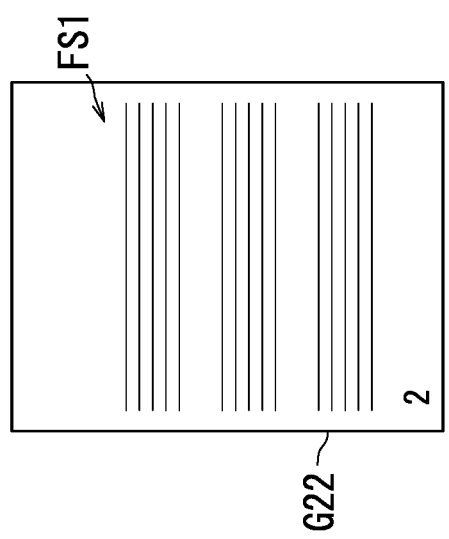
FIG. 16B is a diagram illustrating another image read by the image reading unit of the third embodiment.
Figure 16C:
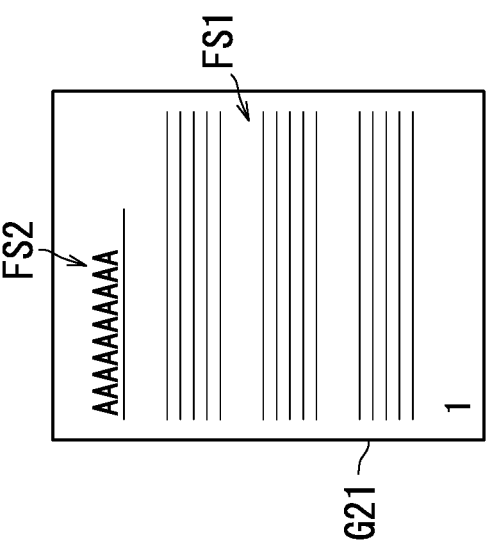
FIG. 16C is a diagram illustrating yet another image read by the image reading unit of the third embodiment.

FIG. 16B is a diagram illustrating an image G22 read by the image reading unit 2. The image G22 includes the character string FS1 of the first size. FIG. 16C is a diagram illustrating an image G23 read by the image reading unit 2. The image G23 includes the character string FS1 of the first size.

Figure 16D:
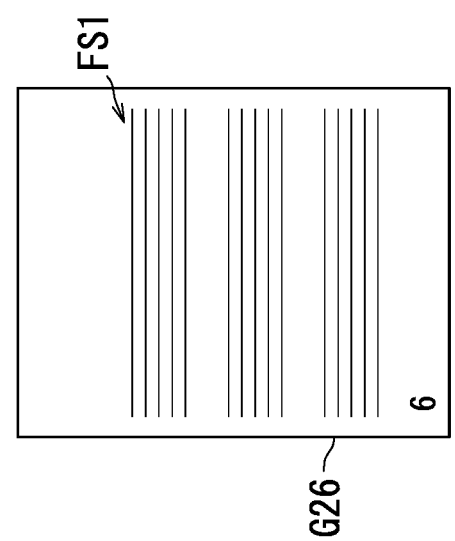
FIG. 16D is a diagram illustrating yet another image read by the image reading unit of the third embodiment.

FIG. 16D is a diagram illustrating an image G24 read by the image reading unit 2. The image G24 includes the character string FS1 of the first size and a character string FS2 of the second size. The character string FS2 of the second size in the image G24 is a document title, for example. The document title is "BBBBBBBBBB". The document title in the image G24 differs from the document title in the image G21 of FIG. 16A.

Figure 16E:
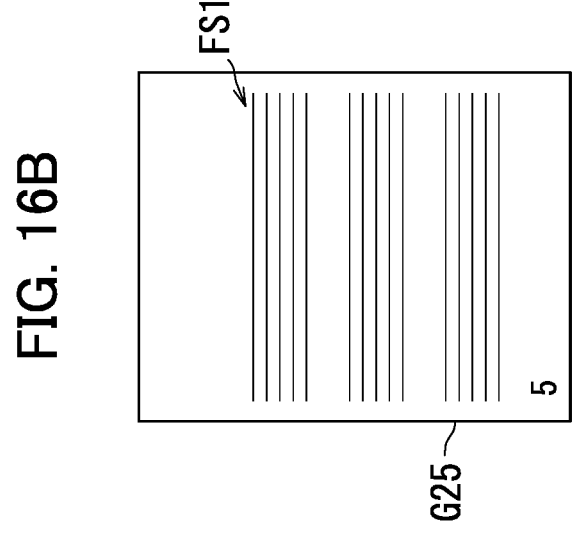
FIG. 16E is a diagram illustrating yet another image read by the image reading unit of the third embodiment.
Figure 16F:
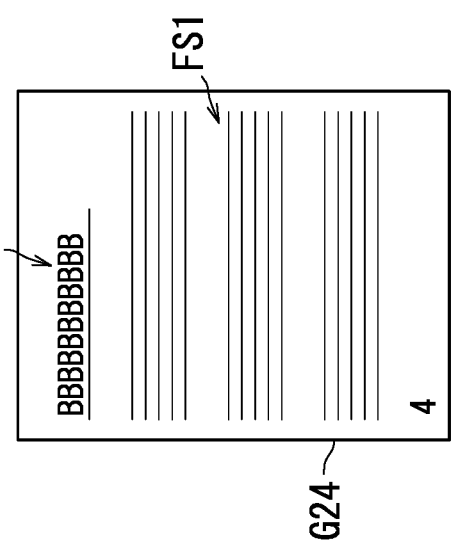
FIG. 16F is a diagram illustrating yet another image read by the image reading unit of the third embodiment.

FIG. 16E is a diagram illustrating an image G25 read by the image reading unit 2. The image G25 includes the character string FS1 of the first size. FIG. 16F is a diagram illustrating an image G26 read by the image reading unit 2. The image G26 includes the character string FS1 of the first size.

FIGS. 17A to 17D are diagrams illustrating sheets PE1 to PE4 on which images are formed by the image forming apparatus 100.

Figure 17A:
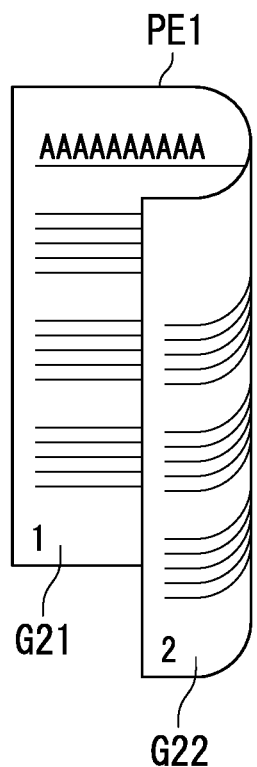
FIG. 17A is a diagram illustrating a sheet on which an image is formed by the image forming apparatus of the third embodiment.

FIG. 17A is a diagram illustrating the sheet PE1 on which images are formed by the image forming apparatus 100. The images G21 and G22 illustrated in FIGS. 16A and 16B are formed on the sheet PE1. Specifically, the image G21 is formed on one of the pair of main surfaces of the sheet PE1. The image G22 is formed on the other of the pair of main surfaces of the sheet PE1.

Figure 17B:
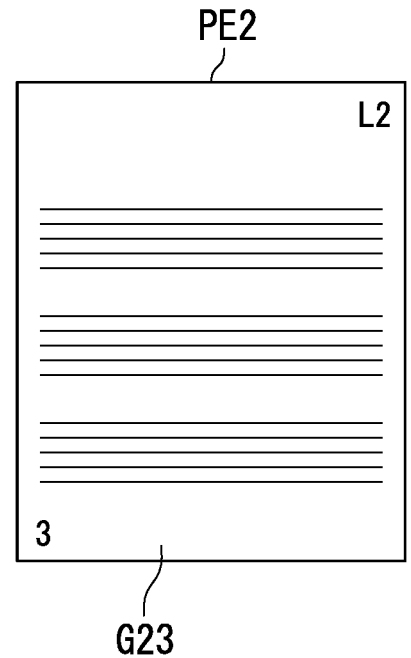
FIG. 17B is a diagram illustrating another sheet on which an image is formed by the image forming apparatus of the third embodiment.

FIG. 17B is a diagram illustrating the sheet PE2 on which an image is formed by the image forming apparatus 100. The image G23 illustrated in FIG. 16C is formed on the sheet PE2.

Figure 17C:
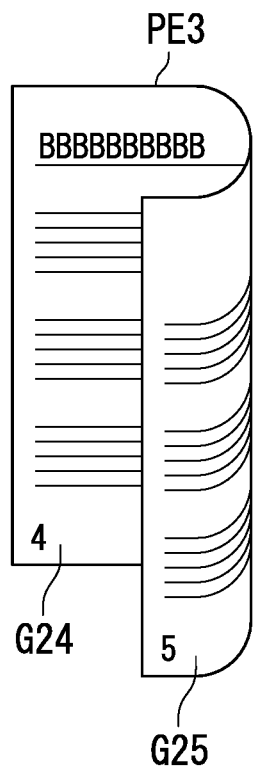
FIG. 17C is a diagram illustrating yet another sheet on which an image is formed by the image forming apparatus of the third embodiment.

FIG. 17C is a diagram illustrating the sheet PE3 on which images are formed by the image forming apparatus 100. The images G24 and G25 illustrated in FIGS. 16D and 16E are formed on the sheet PE3. Specifically, the image G24 is formed on one of the pair of main surfaces of the sheet PE3. The image G25 is formed on the other of the pair of main surfaces of the sheet PE3.

Figure 17D:
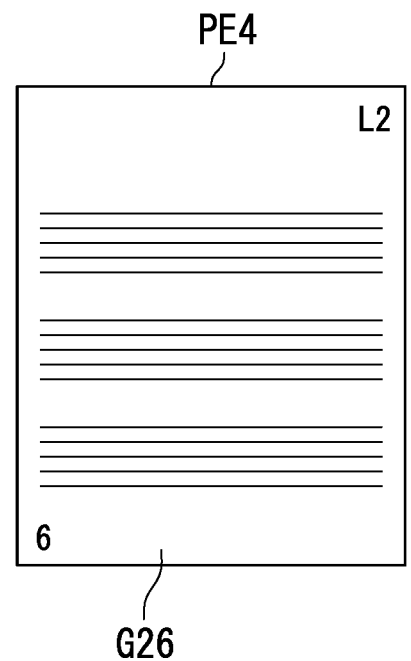
FIG. 17D is a diagram illustrating yet another sheet on which an image is formed by the image forming apparatus of the third embodiment.

FIG. 17D is a diagram illustrating the sheet PE4 on which an image is formed by the image forming apparatus 100. The image G26 illustrated in FIG. 16F is formed on the sheet PE4.

The controller 21 of the third embodiment detects symbols of a size equal to or greater than a threshold from each of the images. The controller 21 then controls the image forming section 14 so as to form an image including the symbols on a sheet P differing from a sheet P on which an image positioned directly before the image including the symbols is formed. Therefore, the image including the symbols of the size equal to or greater than the threshold can be formed on the front side of a sheet P. As a result, the image can be printed so as to be easily seen.

For example, in a case where the layout format assigned to images is the second layout format, the image G24 illustrated in FIG. 16D is formed on the back side of a sheet P. That is, the image G23 is formed on the front side of the sheet P, and the image G24 is formed on the back side of the sheet P. Therefore, the user must look at the back sides of the sheets P when searching for the title in the image G24, which causes trouble. However, according to the third embodiment of the present disclosure, the image G24 including the title is formed on a separate sheet P from the image G23. Therefore, the image including the title can be printed such that searching for the image simplified for the user and the image is easy to see.

Figure 18:
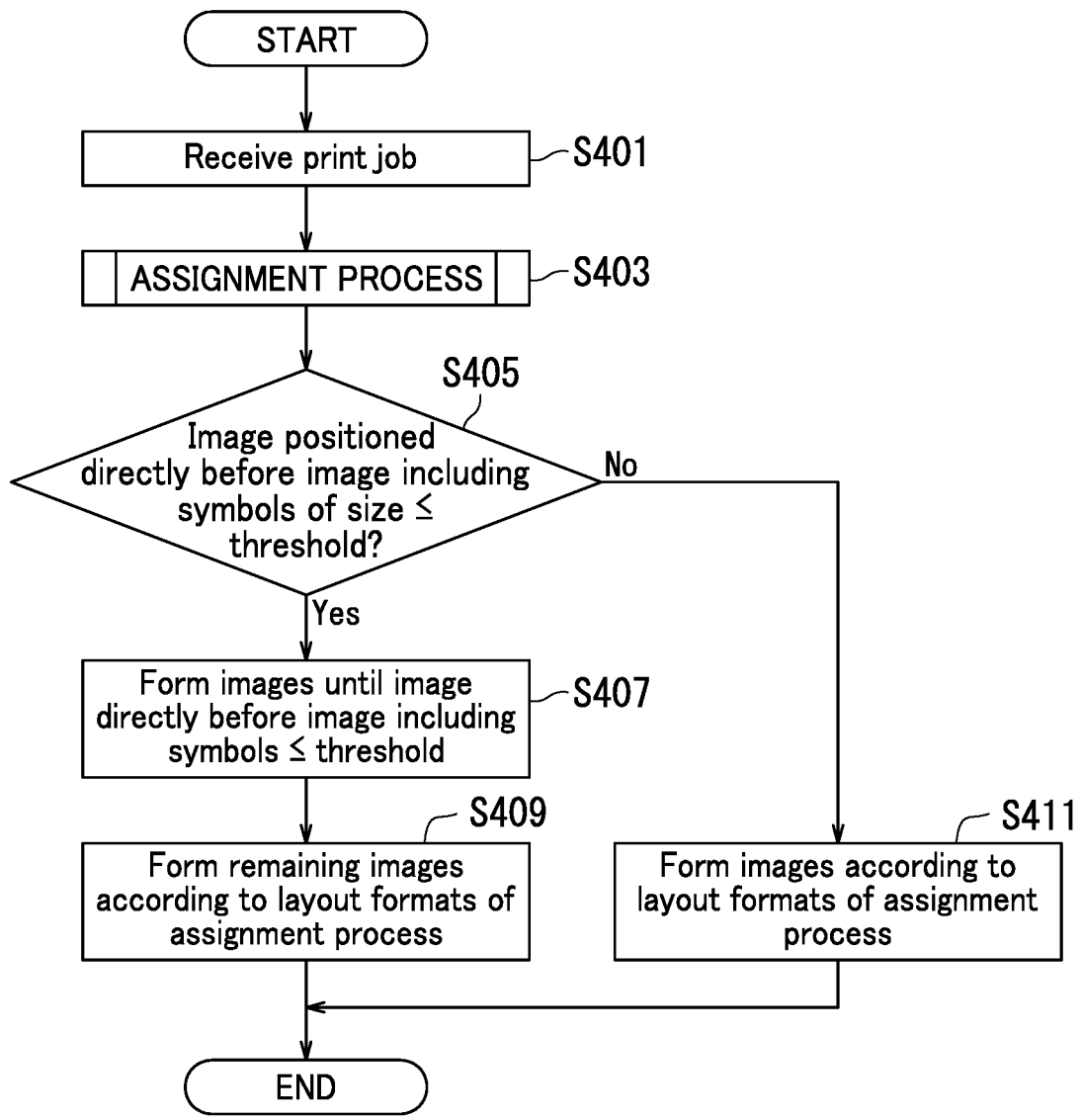
FIG. 18 is a flowchart depicting a process performed by the controller of the third embodiment.

Next, the process performed by the controller 21 of the third embodiment is described with reference to FIGS. 1 and 16A to 18. FIG. 18 is a flowchart depicting the process performed by the controller 21 of the third embodiment. The process performed by the controller 21 of the third embodiment includes Steps S401 to S411.

In Step S401, the controller 21 is on standby until receiving a print job. The process advances to Step S403.

In Step S403, the controller 21 performs an assignment process. The assignment process is the same as the process described with reference to FIG. 12, and description thereof is therefore omitted. The process advances to Step S405.

In Step S405, the controller 21 determines whether or not an image is positioned directly before an image including symbols of a size equal to or greater than the threshold in the order in which the images are to be formed by the image forming section 14. When an image is not positioned directly before an image including symbols of a size equal to or greater than the threshold (No in Step S405), the process advances to Step S411. When an image is positioned directly before an image including symbols of a size equal to or greater than the threshold (Yes in Step S405), the process advances to Step S407.

When an affirmative determination is made in Step S405, the controller 21 controls the image forming section 14 so as to form images on sheets P until the image directly before the image including symbols of a size equal or greater than the threshold in Step S407 based on the layout formats assigned in the assignment process. The process advances to Step S409.

In Step S409, the controller 21 controls the image forming section 14 so as to form images differing from the image including the symbols of a size equal to or greater than the threshold and the images formed in Step S407 on sheets P based on the layout formats assigned in the assignment process. The process ends.

When a negative determination is made in Step S405, the controller 21 controls the image forming section 14 so as to form images on sheets P in Step 411 based on the layout formats assigned in the assignment process of Step S403. The process ends.

Fourth Embodiment

The following describes a process performed by the controller 21 according to a fourth embodiment of the present disclosure with reference to FIGS. 1, 11, and 12.

The process performed by the controller 21 according to the fourth embodiment includes a process of converting a color image to a monochrome image. Other configuration of the image forming apparatus 100 according to the fourth embodiment is the same as the configuration of the image forming apparatus 100 according to the first embodiment, and description thereof is therefore omitted. In the following, points of difference between the fourth and first embodiments are mainly described.

The controller 21 of the fourth embodiment determines whether or not each of the images is a color image. The controller 21 then converts images determined to be color to monochrome. Therefore, the images can be formed on sheets P as monochrome images. As a result, an operation by the user to convert color images to monochrome images can be omitted.

Figure 19:
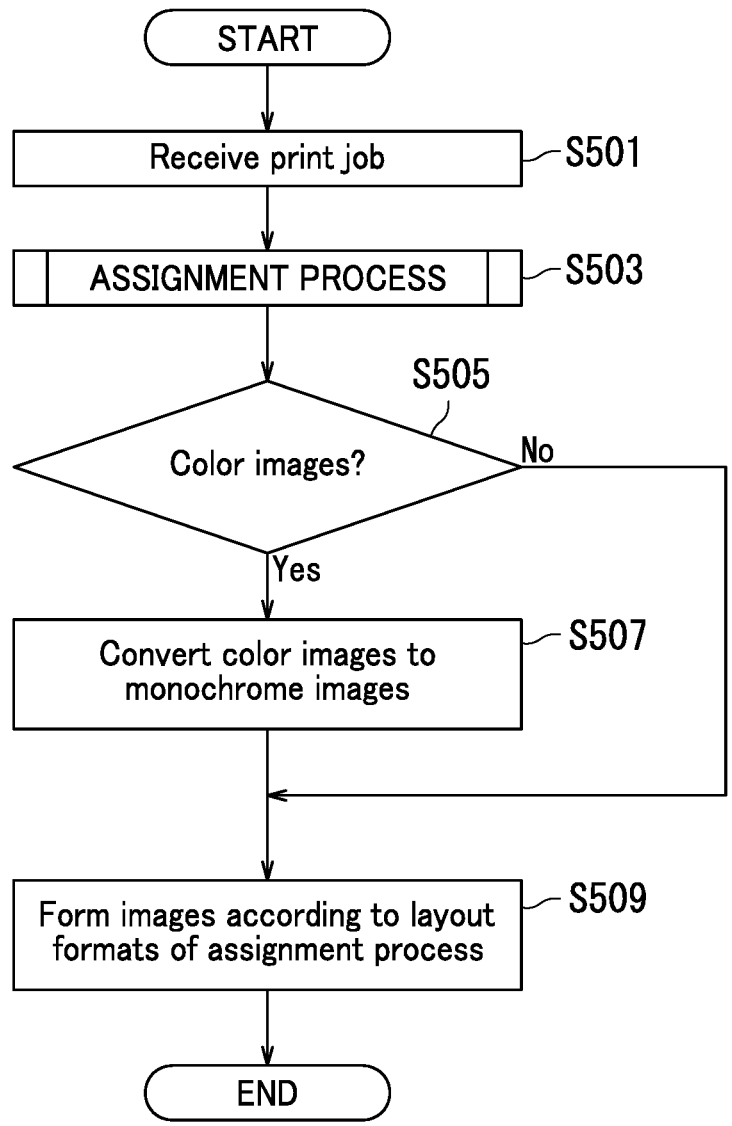
FIG. 19 is a flowchart depicting a process performed by the controller of a fourth embodiment of the present disclosure.

Next, the process performed by the controller 21 of the fourth embodiment is described with reference to FIGS. 1, 11, 12, and 19. FIG. 19 is a flowchart depicting the process performed by the controller 21 of the fourth embodiment. The process performed by the controller 21 of the fourth embodiment includes Steps S501 to S509.

In Step S501, the controller 21 is on standby until receiving a print job. The process advances to Step S503.

In Step S503, the controller 21 performs an assignment process. The assignment process is the same as the process described with reference to FIG. 12, and description thereof is therefore omitted. The process advances to Step S505.

In Step S505, the controller 21 determines whether or not images are color. When none of the images are color (No in Step S505), the process advances to Step S509. When any of the images is color (Yes in Step S505), the process advances to Step S507.

When an affirmative determination is made in Step S505, the controller 21 converts the images determined to be color images to monochrome images in Step S507. The process advances to Step S509.

When a negative determination is made in Step S505, or after Step S507, the controller 21 controls the image forming section 14 so as to form the images on sheets P in Step S509 based on the layout formats assigned in the assignment process of Step S503. The process ends.

The embodiments of the present disclosure are described above with reference to the accompanying drawings. However, the present disclosure is not limited to the above embodiments and may be implemented in various manners within a scope not departing from the gist thereof. Various disclosures may be formed by appropriately combining elements of configuration disclosed in the above embodiments. For example, some elements of configuration may be removed from the entirety of elements of configuration disclosed in the embodiments. Furthermore, elements of configuration may be appropriately combined across different embodiments. The drawings illustrate the main elements of configuration schematically to facilitate understanding thereof. Aspects of the elements of configuration illustrated in the drawings, such as thickness, length, number, and interval, may differ in practice for convenience of drawing preparation. Furthermore, aspects of the elements of configuration described in the above embodiments, such as speed, material, shape, and dimension, are examples and are not particularly limited. The elements of configuration may be variously altered within a scope not substantially departing from the configuration of the present disclosure.

What is claimed is:

1. An image forming apparatus comprising:
an image forming section configured to form a plurality of images on a plurality of sheets;
a receiving section configured to receive a print job including a layout format indicating a layout of the images on the sheets; and
a controller configured to control the image forming section based on the print job, wherein
each of the images indicates an image expressed by image data of a single page,
the print job includes a printing condition for forming the images on the sheets according to a plurality of mutually different layout formats, and
the controller
determines whether or not each of a plurality of images includes a keyword indicating the printing condition,
assigns a layout format indicated by the keyword among the layout formats to an image including the keyword when the image includes the keyword,
assigns a layout format differing from the layout format indicated by the keyword to an image not including the keyword when the image does not include the keyword, and
controls the image forming section so as to form the images on the sheets according to the layout format indicated by the keyword and the layout format differing from the layout format indicated by the keyword.

2. The image forming apparatus according to claim 1, wherein
the layout formats include a first layout format,
the first layout format indicates that one of the images is arranged on one of a pair of main surfaces of one of the sheets, and
the controller
assigns the first layout format to one or more of the images,
assigns a layout format differing from the first layout format among the layout formats to another one or more of the images, and
controls the image forming section so as to form the images on the sheets according to the first layout format and the layout format differing from the first layout format.

3. The image forming apparatus according to claim 1, wherein
the layout formats include a second layout format,
the second layout format indicates that one of the images is arranged on each of a pair of main surfaces of one of the sheets, and
the controller
assigns the second layout format to one or more of the images,
assigns a layout format differing from the second layout format among the layout formats to another one or more of the images, and
controls the image forming section so as to form the images on the sheets according to the second layout format and the layout format differing from the second layout format.

4. The image forming apparatus according to claim 1, wherein
the layout formats include a third layout format,
the third layout format indicates that two or more of the images are arranged on one of a pair of main surfaces of one of the sheets, and
the controller
assigns the third layout format to one or more of the images,
assigns a layout format differing from the third layout format among the layout formats to another one or more of the images, and
controls the image forming section so as to form the images on the sheets according to the third layout format and the layout format differing from the third layout format.

5. The image forming apparatus according to claim 1, wherein
the layout formats include a fourth layout format,
the fourth layout format indicates two or more of the images are arranged on each of a pair of main surfaces of one of the sheets, and
the controller
assigns the fourth layout format to one or more of the images,
assigns a layout format differing from the fourth layout format among the layout formats to another one or more of the images, and
controls the image forming section so as to form the images on the sheets according to the fourth layout format and the layout format differing from the fourth layout format.

6. The image forming apparatus according to claim 1, wherein
the controller
detects a symbol of a size equal to or greater than a threshold from each of the images, and
controls the image forming section so as to form an image including the symbol among the images on a sheet differing from a sheet on which an image positioned directly before the image including the symbol is formed among the sheets.

7. The image forming apparatus according to claim 1, wherein
the controller
determines whether or not each of the images is color, and
converts an image determined to be color among the images to monochrome.

* * * * *